United States Patent [19]

Datwyler et al.

[11] Patent Number: 5,553,249
[45] Date of Patent: Sep. 3, 1996

[54] DUAL BUS ADAPTABLE DATA PATH INTERFACE SYSTEM

[75] Inventors: Wayne C. Datwyler; Dan T. Tran, both of Laguna Niguel; Long V. Ha, Walnut, all of Calif.

[73] Assignee: Unisys Corporation, Blue Bell, Pa.

[21] Appl. No.: 400,700

[22] Filed: Mar. 8, 1995

[51] Int. Cl.$^6$ .................................................. G06F 13/42
[52] U.S. Cl. .......................................... 395/308; 395/309
[58] Field of Search .................................. 395/308, 306, 395/309, 311, 285, 550

[56] References Cited

U.S. PATENT DOCUMENTS

| | | | |
|---|---|---|---|
| 5,191,657 | 3/1993 | Ludwig et al. | 395/306 X |
| 5,195,089 | 3/1993 | Sindhu et al. | 395/308 X |
| 5,404,462 | 4/1995 | Datwyler et al. | 395/308 |
| 5,442,754 | 8/1995 | Datwyler et al. | 395/308 |
| 5,444,860 | 8/1995 | Datwyler et al. | 395/500 |

Primary Examiner—Jack B. Harvey
Assistant Examiner—Glenn A. Auve
Attorney, Agent, or Firm—Alfred W. Kozak; Mark T. Starr; Steven R. Petersen

[57] ABSTRACT

A single chip data path gate array interface links a central processing unit, operating at a first clock rate and single word protocol, to dual system busses operating at a second clock rate and multiple-word protocol. The data path interface holds command, data and message registers, controlled by external logic, in an input channel pathway and an output channel pathway. The interface chip is basically limited to registers and multiplexers making it flexible for use in different architectures such as both Store-Through and Non-Store-Through cache protocols. In addition, such a simplified chip is simple to fabricate and to maintain free of defects.

6 Claims, 6 Drawing Sheets

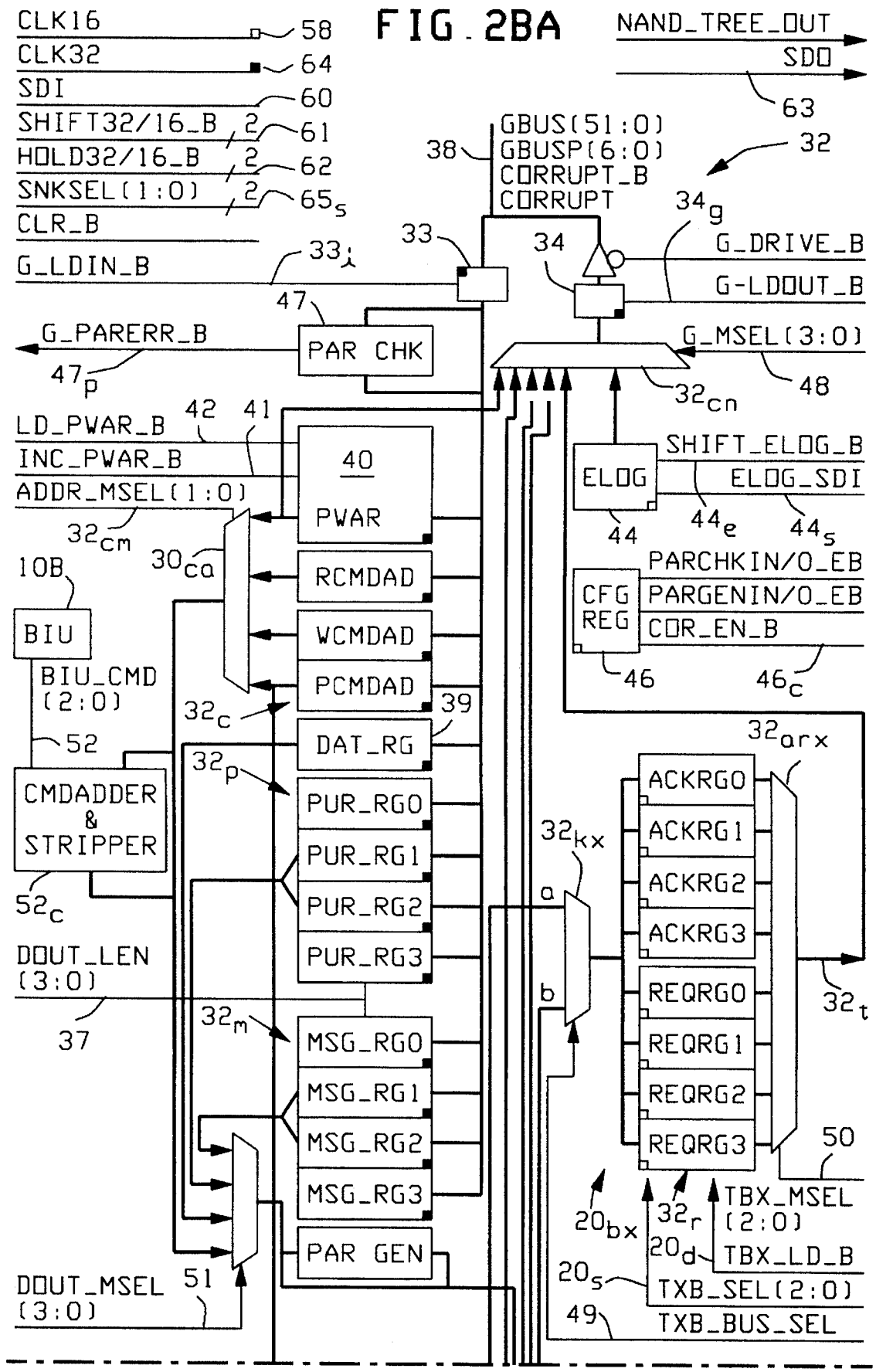

DUAL BUS ADAPTABLE DATA PATH INTERFACE SYSTEM

FIELD OF THE INVENTION

This disclosure relates to data path circuitry in a computer system wherein data transfers are managed through a special gate array chip enabling a processor to communicate with cache units and set of dual system busses.

CROSS REFERENCES TO RELATED APPLICATIONS

This disclosure is related to U.S. applications entitled:

"Translator System for Intermodule Message Transfer" filed Feb. 14, 1992 which issued as U.S. Pat. No. 5,444,860; and "Dual Bus Interface Transfer System" filed Oct. 16, 1992 which issued as U.S. Pat. No. 5,404,462.

"Error Logging System for Loading Error Data Into Processor" filed Aug. 5, 1994 which issued as U.S. Pat. No. 5,495,573.

BACKGROUND OF THE INVENTION

In the usage of computer systems, and particularly on processor boards, there are large amounts of data which often have to be moved between a processor and the system busses. Normally, the amount of printed circuit board real estate available will be at a minimum, while however, the gate count to implement the functions will be of a very high number. Generally the best solution for involvement here, is usually a custom gate array. However the development costs involved therein are usually very high and the gate array must be tailored to the specific application involved.

There is always a design risk associated in the development of a gate array within a system design. The greatest danger is that a fatal error will be discovered within the gate array somewhat late in the design cycle, thus necessitating a recycle, redesign and thus delaying the production schedule.

In order to alleviate this problem, it is desirable to design a gate array so that the danger of a design error within it is very low. In past technology, some gate array designs have had hooks built into them to allow controls to disable portions if an error was discovered during the debug operation.

While this is a desirable action, it required much effort to be extended to implement these functions which also themselves contain a chance for error. The optimum way to solve problems of this sort is to provide a data path that moves and holds data only, while all of the routing and loading controls are implemented in programmable logic outside of the gate array. By using a very simple design, the chances of implementation errors or design errors are reduced to a very low probability.

In the design function, it is most desirable to create a design that is not tightly coupled with a particular system being used. The main benefit of this is that the cost of producing the gate array will be lower as the development costs are spread over a number of useful devices. Additionally it is easy to target the data path architecture to new gate array technologies as incremental improvements are made. This enables designers to lower the development costs and thus speeds up the schedule of any subsequent projects which use the adaptable data path gate array.

In the design process, it is also desirable to create a design that is testable and can also support diagnostics used elsewhere on the printed circuit boards. This can be accomplished by having all flip-flops in the system on a shift chain so the "state" of each circuit or circuit elements can be examined during diagnostics, or additionally, data can be loaded into any register within the gate array. By using boundary scan techniques, the state of all inputs to the array can be examined, as well as allowing any desired value to be driven out of the array to facilitate testing. Further, it is desirable that parity checking and parity generation should be included in the system to insure data integrity throughout the gate array.

SUMMARY OF THE INVENTION

An adaptable data path interface chip is provided which has a simplicity of design and the ability to be configured differently based on the logic surrounding it because all the controls are routed to the outside. The interface chip provides an input pathway and an output pathway between a central processor and dual system busses. Internally, the data path interface chip basically holds only registers for commands, addresses and data plus some switching circuitry and maintenance support circuitry. Thus, the chip is useful for many types of architectural configurations giving it flexibility since it is not locked into usage for just one type of architecture. Thus, the gate array chip provides storage and routing of data between one or two system busses operating at a second clock rate (16 MHz) and a second protocol (4 word packet), and central processing module units operating at a first clock rate and first protocol (single word) of processor, cache, protocol translation-conversion module (to make the system bus protocol and clock rate compatible with the processor). The control logic operating the data path gate array is all "external" to the data path chip, thus simplifying its architecture and functionality.

The adaptable data path interface chip supports both Write-through and Write-back caching (non store-through, NST), translation support for clock rates and protocol, parity checking and generation in addition to operating over two system busses. Configuration registers and shift chains are provided in order to support the testing and diagnostics of the chip circuitry.

GENERAL OVERVIEW

Figure 1:
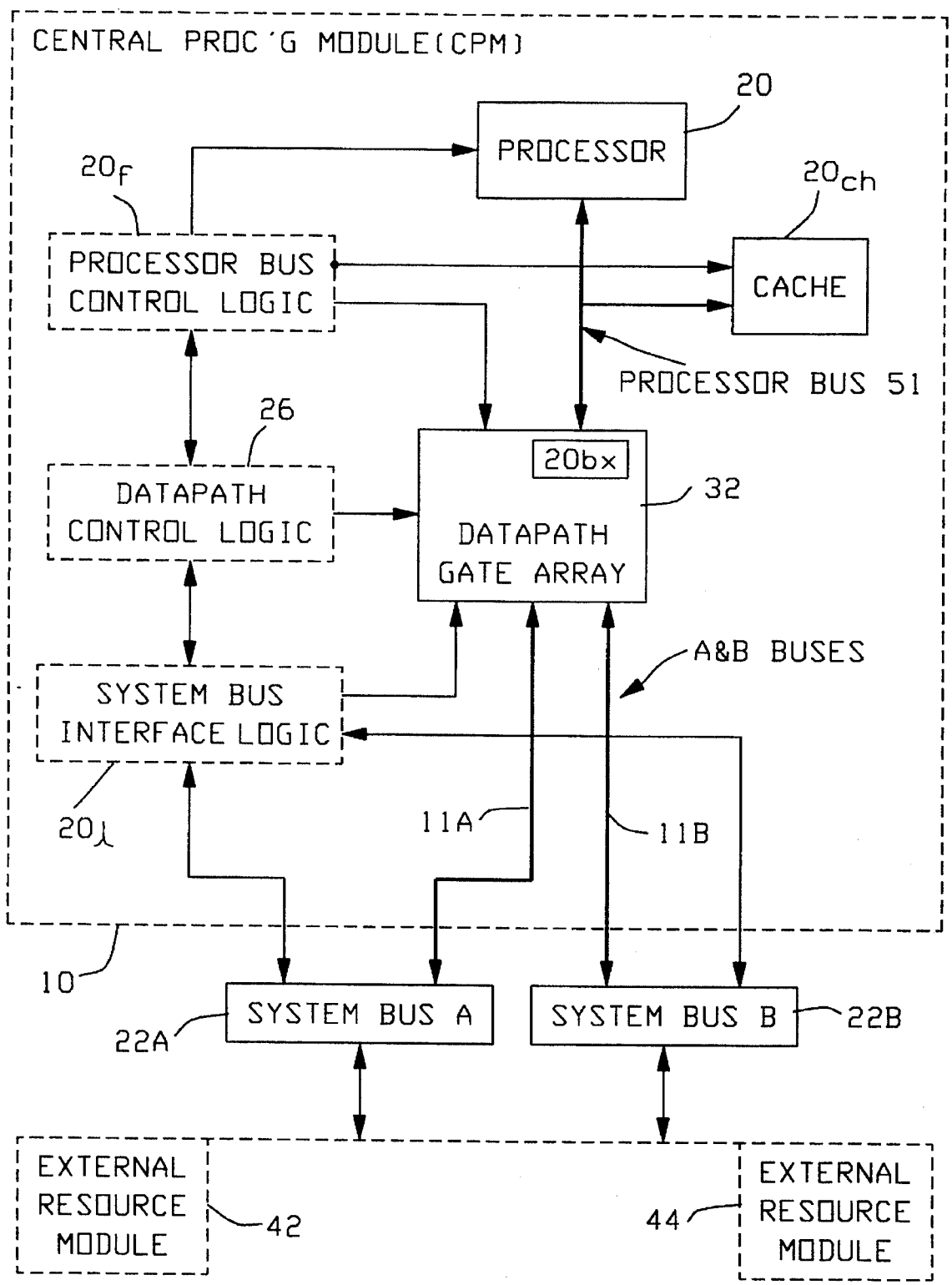
FIG. 1 is a diagram of an integrated circuit gate array chip in a central processing module providing a data path gate array interface unit which enables data transfers between dual system busses and the processor and cache unit.

Referring to FIG. 1, there is seen a central processing module 10 which has internal busses 11A and 11B which connect to external system busses 22A and 22B. The system busses provide communication to external resource modules such as 42 and 44, etc.

The central processing module 10 is typical of the architecture used in the Unisys A-11 series 611, 811 computer systems. Within the central processing module will be found the central processor unit 20 connecting via a processor bus 51 to a cache module $20_{ch}$ and to a integrated circuit single chip data path gate array 32. The data path gate array connects via the A and B busses designated 11A and 11B to the external system busses 22A and 22B.

A processor bus control logic unit $20_f$ provides input to the processor 20, to the cache module unit $20_{ch}$ and to the data path gate array 32. Additionally, the processor bus control logic $20f$ has a communication line to the data path control logic 26 which provides a control output to the data path gate array 32 and also a communication line to the system bus interface logic $20_i$ which is used to control the system busses 22A and 22B.

A translator box module $20_{bx}$ provides a translation logic unit which can be used to take the word message protocol and clock rate of the system busses and translate them into a word message protocol and other clock rate which is compatible to the processor 20.

An external maintenance control processor 200 is provided with communication lines to the central processing module in order to control the loading and routing to increase the flexibility of the data path gate array 32 and to reduce the design risk. Further, all of the controls, such as the processor bus control logic $20_f$, the data path control logic 26 and the system bus interface logic $20_i$, exert their control on the data path gate array 32 from modules "exterior" to the gate array 32. Likewise, the Maintenance Control Processor 200 operates exterior to the gate array 32 but can operate to influence the gate array 32.

Figure 2A:
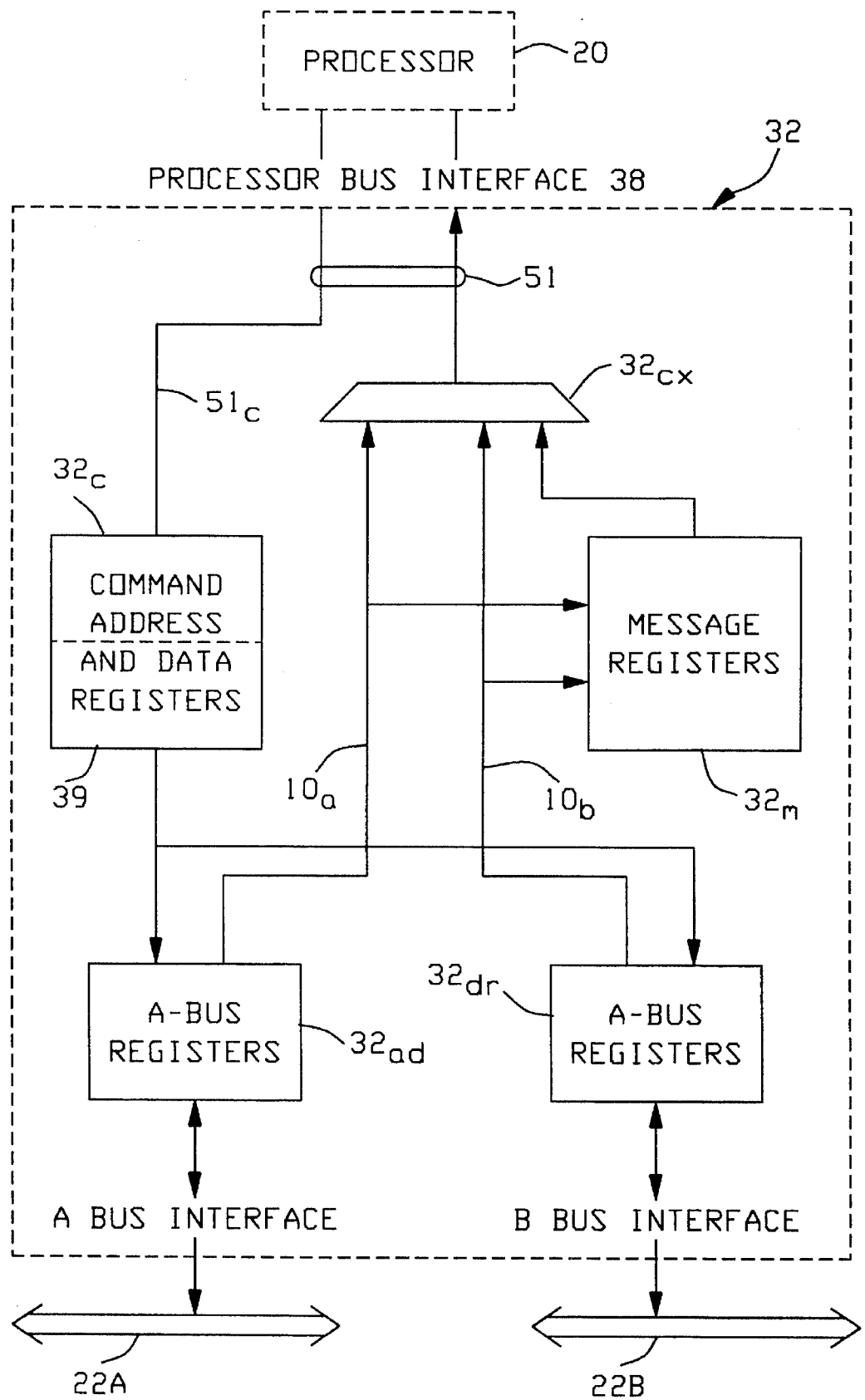
FIG. 2A is a block diagram of the functional units in the IC chip of the data path interface unit.
Figure 2B:
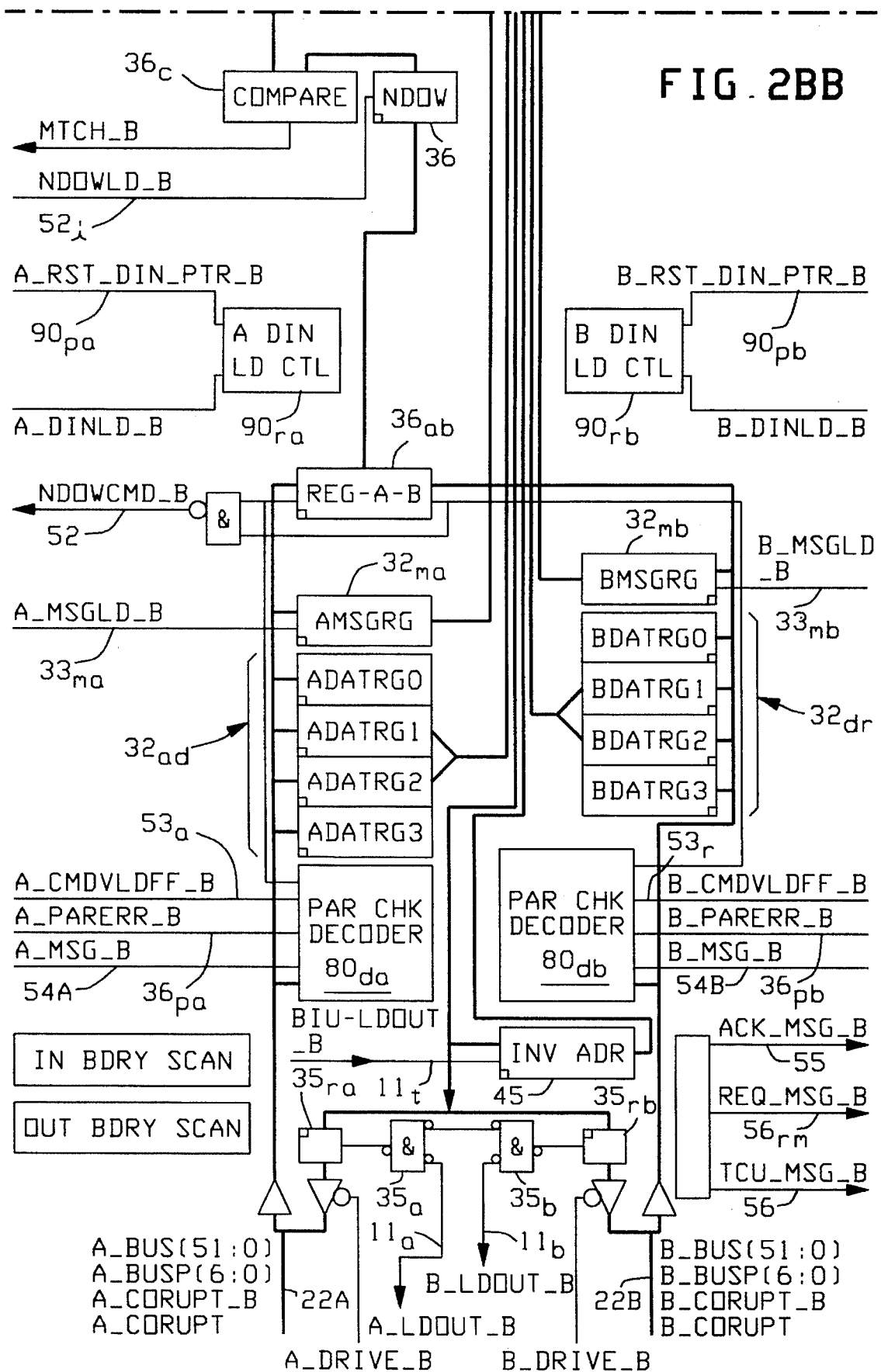
FIG. 2B is a detailed drawing of the data path interface unit chip.
Figure 2C:
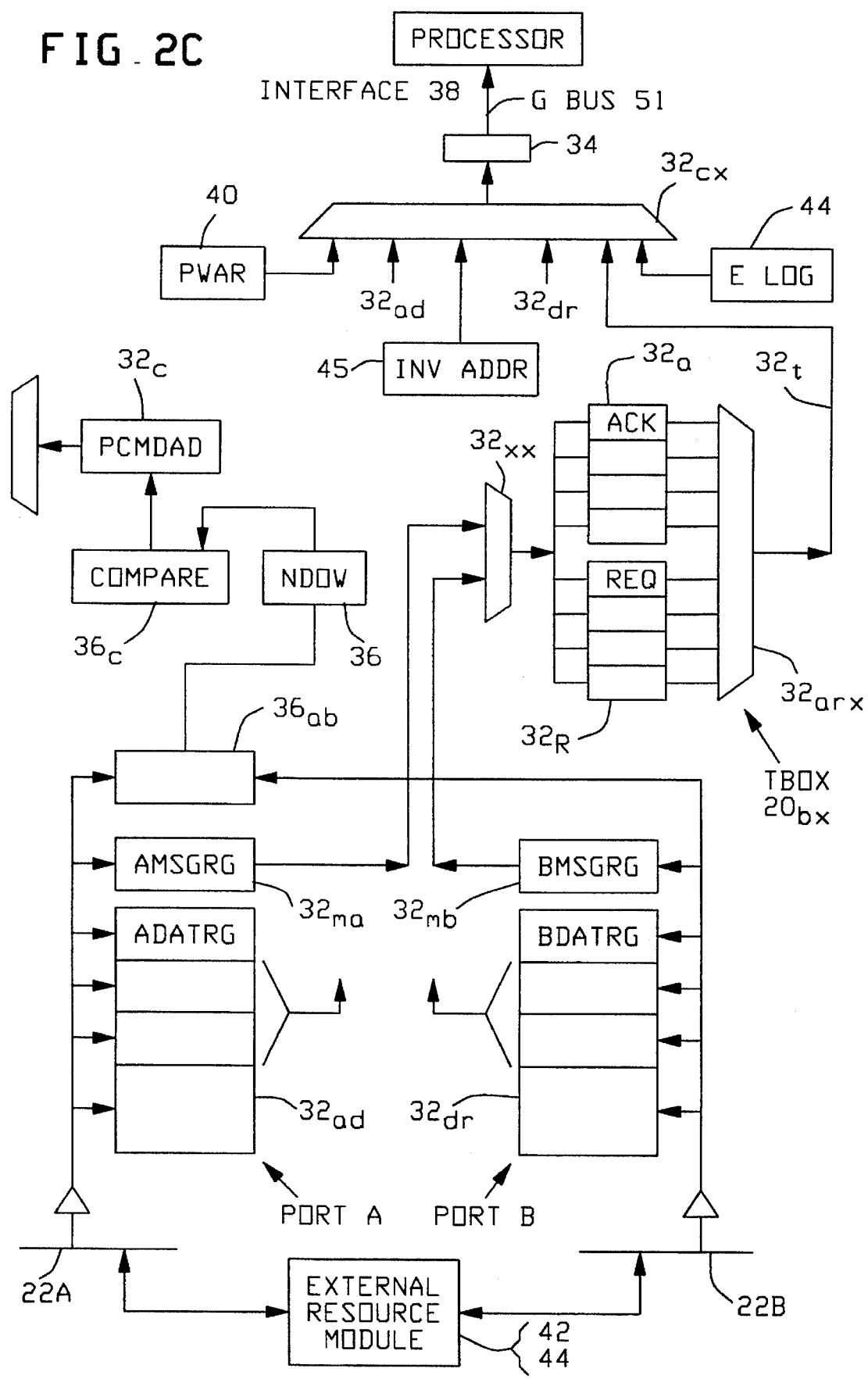
FIG. 2C is a schematic drawing of the input channels of the data path gate array interface unit.

FIG. 2C is a schematic drawing showing the input channels and circuitry of a data path gate array interface chip 32 (DP32).

As seen in FIG. 2C external resource modules such as 42 and 44 are connected to both of the system busses 22A and 22B.

There are basically two port areas, port A and port B, which consist of the bank of data registers (0, 1, 2, 3) designated $32_{ad}$ and the port B data registers (0, 1, 2, 3) designated $32_{dr}$. Each of these ports also have a message register $32_{ma}$ and $32_{mb}$.

Data and messages from the port A and port B are fed through the multiplexer $32_{kx}$ to establish a repository acknowledge of messages in the bank $32_a$ (0, 1, 2, 3) or in the request data banks (0, 1, 2, 3) designated $32_r$. The outputs of the acknowledge message bank and the request data bank are fed through the multiplexer $32_{arx}$ by means of line $32_t$ to the multiplexer $32_{cx}$ where the data can be conveyed through register 34 and interface 38 to the processor 20.

Similarly, data can be taken from port A or port B and fed to the dual register $36_{ab}$. These registers are used for carrying new data overwrites which were sent from the external resource modules 42, 44 over either one of the busses 22A or 22B and placed in the two registers $36_{ab}$.

The new data overwrite register 36 holds the address of the new data to be overwritten into the cache memory $20_{ch}$ (FIG. 1). This address is then used by the compare circuitry $36_c$ to compare it to the addresses which reside in the purge command address register $32_c$, so that if these addresses should match, then the purge command address is aborted so as not to interfere with the new data overwrite operation.

Figure 2D:
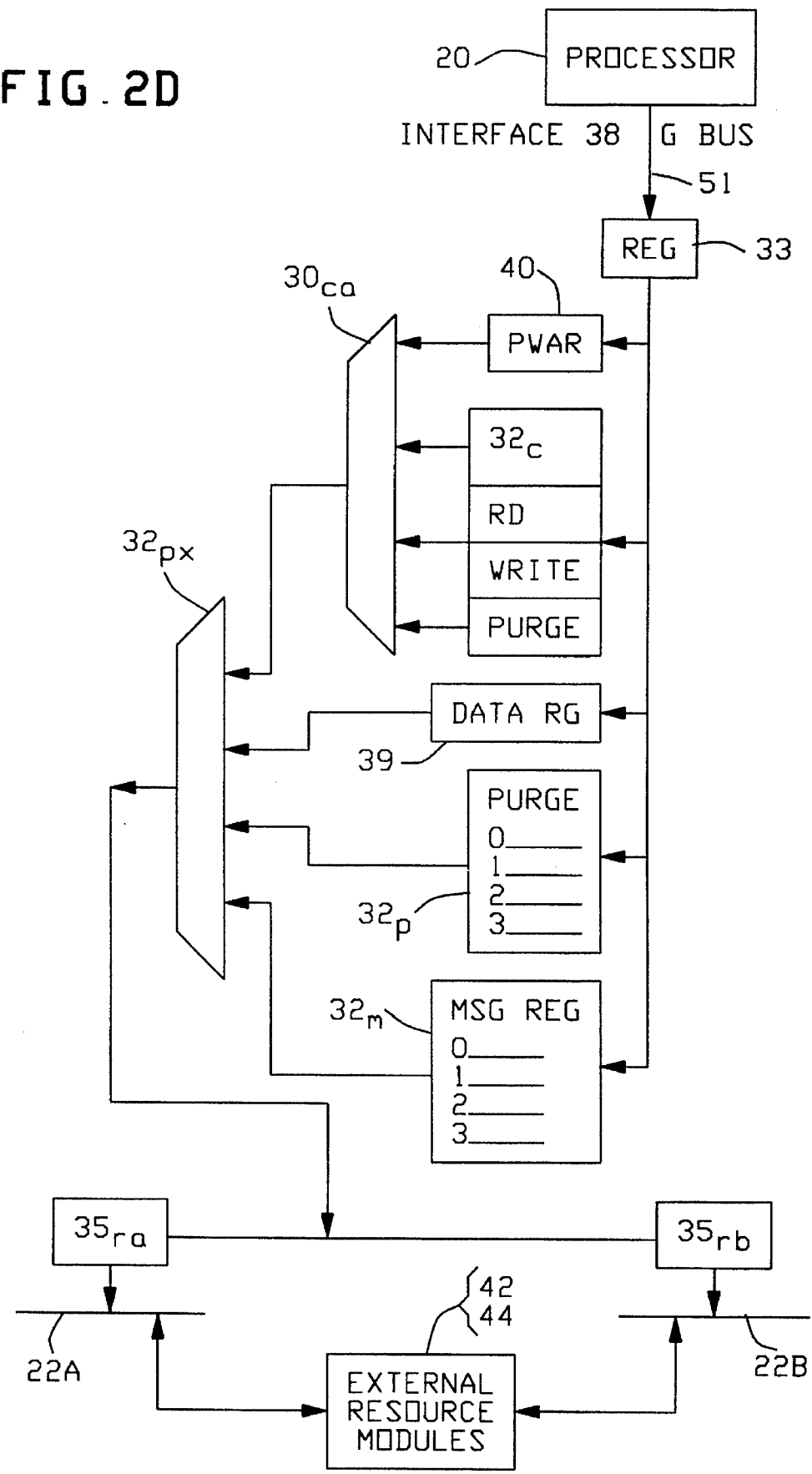
FIG. 2D is a schematic drawing of the output channels of the data path gate array interface unit.

FIG. 2D is a partial schematic drawing of the output channels involved in the data path gate array interface chip of FIG. 2B. (DP32)

Thus, commands and messages from the processor 20 are passed through interface 38 on the G bus 51 to a register 33. The data from register 33 can then be passed onto a number of registers which include the program word address register 40, the command address bank $32_c$ which carries the read command addresses, the write command addresses and the purge command addresses. Further, the data from the register 33 can be fed to the data register 39 and to the set of purge registers $32_p$ (0, 1, 2, 3), or to the message registers $32_m$ (0, 1, 2, 3).

The outputs of the registers 40 and $32_c$ are fed through a multiplexer $30_{ca}$ over to another multiplexer $32_{px}$ for transfer to output registers $35_{ra}$ and $35_{rb}$ for respective transfer to the system busses 22A and 22B.

The data register 39 and the purge registers $32_p$ and the message registers $32_m$ are fed through the multiplexer $32_{px}$ over to the output buffer registers $35_{ra}$ and $35_{rb}$ for transference onto the system busses 22A and 22B.

The control signals for these operations are external to the data path gate array interface chip 32. These external controls are seen in FIG. 1 as the control logic units $20_f$, 26, and $20_i$.

FIG. 2B is a detailed diagram of the single integrated circuit chip which constitutes the data path gate array controller unit 32. A generalized simplified block diagram of this unit is shown in FIG. 2A.

Referring to FIG. 2A, there is seen the two system busses 22A and 22B which connect through respective interfaces shown as the A bus interface and the B bus interface, respectively, to individual sets of registers. Thus, there are two channels provided between the system busses A and B by means of the A-bus registers $32_{ad}$ and the B-bus registers $32_{dr}$. These two channels shown as 10a and 10b provide communication lines from the A and B bus registers to the multiplexer $32_{cx}$ and then on bus 51 to the processor 20.

Each of the channels $10_a$ and $10_b$ are shown connected to a set of message registers $32_m$. These message registers can then convey data to the multiplexer $32_{cx}$ for conveyance to the processor 20.

Another set of registers in the data path gate array chip is shown whereby command and address registers $32_c$ and also data registers 39 have output lines which convey data respectively to the A bus register $32_{ad}$ and to the B bus registers $32_{dr}$ for output onto system busses 22A, 22B. A portion of the interface bus 51 is shown as $51_c$ which indicates the processor communication lines of commands and addresses to the command and address registers $32_c$.

The registers and channel paths shown in FIG. 2A are implemented on a single integrated circuit chip which is designated as the data path gate array interface chip 32.

The data path gate array interface chip unit 32 shown in FIG. 2A provides a facilitating mechanism so that data can be passed between processor 20, the cache module $20_{ch}$ and the system busses 22A and 22B while additionally providing synchronization of data, providing diagnostics and boundary scan, in addition enabling use of the translator box $20_{bx}$ and error logging mechanisms together with parity generating and checking.

The data path gate array interface chip 32 is adaptable for data transfers between either one or two system busses and operates such that all routing and loading is controlled from the outside via logic $20_f$, 26, $20_i$ and maintenance processor 200. Due to the nature of the data path gate array interface chip which is controlled from the outside by the processor bus control logic $20_f$ and the data path control logic 26 and the system bus interface logic $20_i$, the data path gate array 32 can be developed by substantially limiting the data path array chip to registers and multiplexers in a standard pattern which is both flexible and which reduces design risk and is further adaptable to use with the cache modules on a store-through or a write-back basis.

Additionally, the data path gate array interface chip is implemented with circuitry to read errors at the same time reducing system bus taps, in addition to its capability of using one or two system busses which involve different protocols and clock rates between the system busses and the cache module units. Further, boundary scan diagnostic systems are also implemented in the data path gate array chip unit.

DESCRIPTION OF PREFERRED EMBODIMENT

The present disclosure involves a DP (Data Path) 32 gate array chip the description of which is broken down into several portions. The first part describes the registers used in the gate array including their purpose and how they are loaded.

The second portion illustrates how parity is maintained and checked with the system.

The next section illustrates how the multiplexers are controlled from outside the gate array.

Subsequently there is a description of the command decoding and the encoding functions. The final description shows the shift chains used within the gate array.

Generally, the DP 32 gate array registers are 61 bits in length. These registers in the DP 32 will fall into three broad categories: (i) data registers; (ii) command-address registers; or (iii) miscellaneous registers.

The DP 32 gate array interface is composed of an array of registers connected with multiplexers in order to serve the purpose of routing data into and out of a bus interface unit 10B (BIU). This bus interface unit 10B (BIU) is typical of that used in the Unisys A11-Model 611, 811 series of computer systems. Together with its external control logic, the DP 32 gate array transfers data between the A11 system bus environment (working at 16 megahertz) and the instruction processor (IP)/cache environment which works at a 32 megahertz rate.

In support of the A11 central processing module (CPM), the DP 32 gate array supplies the register structures to aid four-word memory operations, to aid message transfer and storage, and to fulfill one-level deep Write buffering.

Additionally, the DP 32 gate array furnishes a program word address register (PWAR), an error log circuit, parity checking and generating logic, bus command decoding logic, and a buffer which holds any command/address words on which an invalid address error was detected.

Diagnostic testing and support is added with internal shift chains through all the internal flip-flops and a boundary scan feature is provided that allows all inputs to be sampled and all outputs to be driven to any given value. In order to enable copy-back (non-store-through) (NST) cache memories, the DP 32 gate array is arranged to support these functions. This is done by adding a-purge command buffer, a double buffered New-Data-Overwrite (NDOW) command queue, and additional logic to compare purge addresses with NDOW addresses.

The dual bus adaptable data path system allows data transfer between a processor, a cache memory, and two system busses while also synchronizing data, and providing diagnostics and boundary scan operations. The data path system also implements a translator box and an error logging mechanism in addition to parity checking and parity generation as indicated under Cross References to Related Applications.

The presently described system provides a flexibility value in that it is adaptable to one or two system busses. All routing and loading is controlled from the outside of the gate array chip (DP 32) in order to increase flexibility and to reduce the design risk. The system is of further use in that it is adaptable to store-through (ST) or for a write-back (WB) (non-store-through) (NST) cache memory units. Synchronization is provided for, outside of the gate array and can be adjusted for any clock rate via outside control units.

The present system provides an unusual flexibility to the gate array data path system since all controls are handled from the outside of the gate array. Further flexibility is provided due to implementation of the mechanism to read errors while reducing the system bus taps, and the ability to use not only one, but either one of two system busses in addition to using different cache protocols and the use of a boundary scan system.

The data path gate array 32 is composed of registers which fall into three broad categories: (i) data registers; (ii) command registers; (iii) miscellaneous registers.

The command address registers are shown at $32_c$ in FIG. 2B. The command address registers $32_c$ in FIG. 2B will be seen to provide three separate registers for the Read command register address, RCMDAD, the Write command address, WCMDAD, and the Purge command address, PCMDAD. The Command Registers $32_c$ conform to the system bus command formats of the Unisys A11 System Bus. Bits 51:40 are ignored, except for parity. Bits 39:32 contain the system command. Bits 31:0 contain the address for the command. Bits 57:52 insure odd parity on their respective byte fields. This is seen in the attached Table 1.2. The bits 60:59 are the corrupt bits, which are ignored for command words.

TABLE 1.2

| Command Register Bit Assignments | | |
|---|---|---|
| Bit Group | Field Description | Parity Bit |
| 7:0 | Command word address byte 0 | 52 |
| 15:8 | Command word address byte 1 | 53 |
| 23:16 | Command word address byte 2 | 54 |
| 31:24 | Command word address byte 3 | 55 |
| 39:32 | A11 System Bus Command | 56 |
| 47:40 | Reserved byte | 57 |
| 51:48 | Reserved nibble | 58 |
| 52 | Odd parity bit for address byte 0 | 7:0 |
| 53 | Odd parity bit for address byte 1 | 15:8 |
| 54 | Odd parity bit for address byte 2 | 23:16 |
| 55 | Odd parity bit for address byte 3 | 31:24 |
| 56 | Odd parity bit All system bus command | 39:32 |
| 57 | Odd parity bit for reserved byte | 47:40 |
| 58 | Odd parity bit for reserved nibble | 51:48 |
| 59 | Corrupt Bar | 60 |
| 60 | Corrupt | 59 |

The data registers for each one of the system busses are shown in FIG. 2B with a respective designation $32_{ad}$ and $32_{dr}$ and will be each seen to be composed of registers 0, 1, 2, and 3.

The Table 1.1, shown below, indicates the register bit assignments.

TABLE 1.1

Register Bit Assignments

| Parity Bit | Field Description | Bit Group |
|---|---|---|
| 51:0 | R-Mode data word | |
| 52 | Odd parity bit for data byte 0 | 7:0 |
| 53 | Odd parity bit for data byte 1 | 15:8 |
| 54 | Odd parity bit for data byte 2 | 23:16 |
| 55 | Odd parity bit for data byte 3 | 31:24 |
| 56 | Odd parity bit for data byte 4 | 39:32 |
| 57 | Odd parity bit for data byte 5 | 47:40 |
| 58 | Odd parity bit data nibble | 51:48 |

TABLE 1.1-continued

Register Bit Assignments

| Parity Bit | Field Description | Bit Group |
|---|---|---|
| 59 | Corrupt Bar | 60 |
| 60 | Corrupt | 59 |

Bits 51:0 constitute the normal data word. Bits 58:52 are the parity bits. Odd parity is calculated on each data byte. Bit 52 corresponds to the odd parity on data bits 7:0, while bit 51 corresponds to the odd parity on data bits 15:8 etc.

Bit 60 is the "corrupt" bit, and bit 59 is the "corrupt-bar" signal, which is an inverted value of the "corrupt" bit. The corrupt bit is used to flag a word which was earlier detected to have a parity error. The "corrupt" and the "corrupt-bar" bits are always in opposition to one another. When they ever have the same value, then neither value can be trusted because a hardware error would be found to exist.

The miscellaneous registers within the data path 32 gate array do not conform to any particularly single register layout, but rather each is adapted specifically to its own function. These miscellaneous registers are of varied size and organization. However, each of the miscellaneous formats will be described and discussed hereinafter.

The data path gate array 32 is supplied with two clock frequencies which may, for example, be: (i) a 16 MHz clock (line 16) and (ii) a 24 or 32 MHz clock (line 64). These clocks are asynchronous to one another, being derived from two different crystal clock oscillators. Thus, the registers within the data path gate array 32 will be seen operative in one of two categories: that is to say, 32 Mhz or a 16 MHz category.

Shown below is the Table 1.3, which indicates the DP 32 gate array registers and the clock frequencies involved in each. The register types are defined as C for command, D for data and M for miscellaneous. Some registers are used to facilitate information transport and as such, are sometimes used for temporary storage of both data and commands.

TABLE 1.3

DP 32 Registers and Their Clock Frequencies

| Register Name | Abbreviation | Type | n | Clock |
|---|---|---|---|---|
| GAHP_IN_REGISTER | GIN_REG | D/C | — | 32* |
| GAHP_OUT_REGISTER | GOUT_REG | D/C | — | 32* |
| PROGRAM WORD ADDRESS REGISTER | PWAR | C | — | 32* |
| READ_COMMAND | RDADDR_REG | C | — | 32* |
| WRITE_COMMAND | WRADDR_REG | C | — | 32* |
| PURGE_COMMAND | PRGADDR_REG | C | — | 32* |
| DATA_REGISTER | DATA_REG | D | — | 32* |
| PURGE_REGISTER_n | PRG_REGn | D | 4 | 32* |
| MESSAGE_REGISTER_n | MSG_REGn | D | 4 | 32* |
| ERROR_LOG_REGISTER | ELOG | M | — | 16 |
| CONFIGURATION_REGISTER | CONFIG | M | — | 16 |
| ACKNOWLEDGE_MESSAGE_REGISTER_n | ACK_REGn | D | 4 | 16 |
| REQUEST_MESSAGE_REGISTER_n | REQ_REGn | D | 4 | 16 |
| x_MESSAGE_REGISTER | x_MSG_REG | D | — | 16 |
| x_DATA_REGISTER_n | x_ATA_REGn | D | 4 | 16 |
| x_NEW_DATA_OVERWRITE_REGISTER | x_NDOW_IN | C | — | 16 |
| NEW_DATA_OVERWRITE_n | NDOW_n | D | 2 | 16 |
| INVALID_ADDRESS_REGISTER | INVADDR | C | — | 16 |
| x_OUTPUT_REGISTER | x_OUT_REG | D/C | — | 16 |

*Indicates the clock frequency can be varied to desirable MHz

Interface Registers: All data enters and exits the data path gate array 32 by means of interface registers. Referring to FIG. 2B, at the G-Bus interface 38, the instruction processor 20 (IP) and cache commands, addresses and data pass through the G-Bus Input Register (GIN-REG) 33. The register 33 captures the contents of the G-Bus on the rising edge of the instruction processor (IP)/Cache Clock when the signal G-LDIN-B is "low". This signal line is shown on line $33_i$ of FIG. 2B.

In many cases, the G-LDIN-B signal may always be driven active to capture data from the instruction processor (IP) on each IP clock. The G-Bus control logic (external to chip), after decoding the processor command and control signals, will be routed and then store the contents of the GIN-REG as appropriate to the type of operation being executed.

Data being returned to the instruction processor 20 (IP) and the cache $20_{ch}$ is captured on the G-Bus Output Register (34 FIG. 2B) at the G-Bus interface 38 to the chip. The G-Bus Output Register 34 (GOUT-REG) stages all of the data being returned to the instruction processor 20. The GOUT-REG register 34 (FIG. 2) is loaded on the rising edge of the IP/Cache Clock if the line G-LDOUT-B is "low", This is shown on line $34_g$.

In many cases, the signal G-LDOUT-B on 34g may always be driven active to capture data from the data path gate array 32 on each clock. The GOUT-REG 34 is clocked with the IP/Cache Clock.

System Bus Interface Register: Data and commands sent to the system busses 22A, 22B are staged in the x-OUT-REG ($35_{ra}$, $35_{rb}$) before being presented on the A or B bus. The x-OUT-REG is loaded on the rising edge of the system clock when either the of the line signals A-LDOUT-B (SYS-LDOUT-B) signal $11_a$ is "low". This also applies to the B-LDOUT-B signal on line $11_b$.

It should be noted that the BIU-LDOUT-B signal, $11_l$ will load both the A-OUT-REG ($35_a$), the B-OUT-REG ($35_b$), and Invalid Address Register 45, while the x-LDOUT-B 11a, 11b signals will respectively load only the x-OUT-REG $35_{ra}$ $35_{rb}$.

Data arriving from the system bus 22A, 22B is of two types: memory data being returned as part of a four-word memory Read operation, or message data being sent by an external module such as an input/output module, IOM, which may be seen as one of the external resource modules 42, or 44 in FIG. 1A.

Referring to FIG. 2B, which shows a detailed diagram of the data path gate array, it will be seen that data read from system memory (external resource module 44 FIG. 1A), is loaded directly into the x-DATA-REGn registers, seen as blocks $32_{dr}$ and $32_{ad}$ in FIG. 2B. Each register will accept one of the four data words returned on a four-word memory operation holding the data while the cache-fill operation completes.

Each x-DATA-REGn ($32_{ad}$, $32_{dr}$) receives and stores the nth word returned from the memory operation, respectively. The "x" designation in a signal name indicates two distinct signals, one for bus A and bus B. The x-DATA-REGn register(s) is loaded on the rising edge of the system bus clock when the signal x-INCR-DIN-PTR-B is "low" and the counter value of the data pointer maintained by the data path gate array 32 is set to "n". The x-INCR-DIN-PTR-B (increment data-in pointer) signal is also used to increment the data pointer for the x (A, B) system bus 22A, 22B. The operation of the data pointer will be discussed hereinafter.

Message words from the instruction processor 20 are staged in the registers $32_m$, (0,1,2,3) designated x-MSG-REG and are staged prior to being delivered into the appropriate register set within the translator box $20_{bx}$ (T-Box). The T-Box Registers $20_{bx}$ and their activities in message operations will be discussed hereinafter. The x-MSG-REG (block $32_m$) loads on the rising edge of the system bus clock when the signal x-MSG-LD-B signal is "low", (lines 33ma, 33mb).

As seen in FIG. 2B, there are three NDOW (New Data Overwrite) Input Registers, 36 (three registers), which hold NDOW operations detected on the system bus 22A, 22B (involving data sent from the external resource modules 42 or 44), for comparison to Purge operations which are in progress. These three NDOW registers involve an x-NDOW-REG set and also two holding registers NDOW-REGn, where n is 0 or 1.

To preserve data integrity in copy-back cache architectures, "Purge" operations, that would overwrite data recently supplied by a NDOW command, (New Data OverWrite) must be preempted. On subsequent clocks, the addresses of NDOW-REG1 36 are compared with the addresses of outstanding Purge commands.

The x-NDOW-IN register (36) is loaded on each rising edge of the system bus clock. The NDOW-REG is loaded on the rising edge of the second system bus clock following the detection of a NDOW command on the system bus 22A, 22B. The NDOW-REG1 is loaded on the rising edge of the system bus clock when the signal NDOW-LD-B signal 52i is "low".

Dual Register $36_{ab}$ in FIG. 2B will detect new data and will load one portion for Bus 22A and one portion (duplicate) for Bus 22B. The data is then placed into a single register in NDOW 36 for comparison purposes by comparator $36_c$ for a match with the address loaded. If a match occurs, then the corresponding purge command address (PCMAD) $32_c$ will be nullified by the external logic so as not to wipe out the new data overwrite input. Thus, in a copy-back cache architecture, new data overwrites into cache and later into main memory 44, are preserved from wipeout or purging by nullifying the purge command having a matching address.

Instruction Processor 20 (IP) Operation Registers: The following Table 1.4 will indicate the register load selection for the instruction processor (IP). The right-hand side of the Table shows the particular register which is selected for loading. The purge registers PRG-REG (0,1,2,3) are designated as $32_p$, FIG. 2B.

The Write Address Command Register WCMDAD, and the Read Address Command Register RCMDAD and processor command address register, PCMDAD, are shown in block $32_c$ of FIG. 2B.

The DOUT-LDEN (Data Out Load Enable) field is shown on line 37 of FIG. 2B and further indicated on the left-hand column of Table 1.4. The IP operation registers are loaded on the rising edge of the IP/Cache Clock when the DOUT-LDEN(3:0) field has been decoded in order to select one of the registers shown on the right-hand column of Table 1.4.

TABLE 1.4

IP Register Load Selection

| DOUT LDEN | Register Selected for Load |
| --- | --- |
| F | DATA_REG 39 |
| E | PRGADDR 32p |
| D | WRADDR_REG |
| C | RDADDR_REG |
| B | MSG_REG3 32m |
| A | MSG_REG2 |
| 9 | MSG_REG1 |
| 8 | MSG_REG0 |
| 7 | PRG_REG3 32p |
| 6 | PRG_REG2 |
| 5 | PRG_REG1 |
| 4 | PRG_REG0 |
| 3 | No register selected |
| 2 | No register selected |
| 1 | No register selected |
| 0 | No register selected |

The IP operation registers are loaded from the G-Bus, 38, FIG. 2. The A-11 G-Bus is captured at the boundary of the chip in a GIN-REG register, 33, FIG. 2B.

Parity is checked at the output of the GIN-REG, 33. The contents of this register are subsequently loaded (based upon word-type: Code read; Data read; Write; Purge) into: a command register $32_c$ (R, Read command, W, Write command, P, Purge command), or into a data register, 39, FIG. 2B, or into a Purge register, $32_p$, or the program word address register (PWAR) 40, or a message register $32_m$, depending on the operation required.

The data path gate array 32 has a register to store one each of the three command types: (i) Read commands; (ii) Write commands; and (iii) Purge commands. Message operations are handled similarly to the four-word Write operation and use the Write command register in FIG. 2B at $32_c$ (WCM-DAD).

The Read, Write and the Purge commands are stored respectively in the RDADDR-REG (RCMDAD), the WRADDR-REG, (WCMDAD) and the PRGADDR-REG registers, respectively. Each register contains the command and its associated memory or destination module address.

In the case of a Write command, the data path gate array 32 will also accommodate the word to be written to memory in the DATA register 39, FIG. 2B. This relieves the instruction processor 20 (IP) of all information required to complete the Write operation and allows the instruction processor (IP) to continue with other activities while the bus interface unit (BIU) carries out the Write operation. The BIU constitutes the entire data path chip 32, and Control Logic Modules $20_p$, 26, $20_i$ of FIG. 1.

Message commands are another form of a Write command. Message command words are stored in the Write command address register 32c (WCMDAD) and will trigger a BIU operation that resembles a four-word Write or a Purge operation. The essential distinction between message and Purge operations is that the message operations are directed to input/output modules (IOMs which could be indicated in FIG. 1 as external resource modules 42) while Purge and Write operations are directed to Memory Storage Modules (MSMs) which could be indicated as element 44 in FIG. 1A. Prior to issuing the Message command, the IP 20 writes the four message words into the four message registers: MSG-REGn, (0,1,2,3) $32_m$ of FIG. 2B.

Purge commands write the data in the four Purge registers, $32_p$, back into the external resource main memory 44. The Purge registers are designated as PRG-REGn, 32p. The Purge operation supports copy-back cache architectures.

The Program Word Address Register (PWAR), element 40 can be operated as a 61-bit register. When the signal INC-PWAR-B on line 41 is "low", then the lower 32 bits of the PWAR register 40 are synchronously incremented on the rising edge of the IP clock.

When the signal G-LDPWAR-B on line 42, FIG. 2B, is "low", the PWAR register 40 is loaded on the rising edge of the IP clock with the contents of the GIN-REG 33. The PWAR 40 is loaded with the address presented on READ-CODE operations, and incremented at the completion of READ-CODE, READ-NEXT-CODE, or FETCH-CODE operations. The PWAR register 40 supplies the address for the READ-NEXT-CODE AND FETCH-CODE memory read operations.

Transfer Box 20 $_{bx}$(T-Box) Registers: The data path gate array 32 provides two four-word register banks to store the last "acknowledge" and the last "request" message sent to the central processing module 10 (CPM). "Acknowledge" messages are stored in the ACK-REGn (0,1,2,3) registers $32_a$, FIG. 2B. Request Messages are stored in the REQ-REGn registers $32_r$, (0,1,2,3) FIG. 2B.

The data path gate array 32 functions as a "bus interface unit" between the processor 20 and the system busses 22A and 22B. Hence, the data path gate array 32 is often called a data path bus interface unit. A complete bus interface unit could be said to include also the processor bus control logic $20_p$, the data path control logic 26, and the system bus interface logic $20_i$, seen in FIG. 1.

The bus interface unit (10B, FIG. 2B at BIU CMD line 52), BIU, which is external to the gate array 32, manages the controls which load the nth word of a message into the appropriate registers designated ACK-REGn 32a or the register REQ-REGn 32r. Messages may be loaded from either system bus 22A, 22B into the T-Box registers, $20_{bx}$. The T-Box registers are the registers in FIG. 2B shown as $32_a$ and $32_r$, which are in the T-Box $20_{bx}$. The BIU 10B selects the bus from which to load the T-box registers by driving a signal to TBX-BUS-SEL multiplexer $32_{kx}$.

The following table designated Table 1.5 shows how the bus selection via line 49 is done from the T-box bus select line, (49).

TABLE 1.5

| T-Box Bus Selection ($32_{kx}$) | |
|---|---|
| TBX BUS SEL | System Bus Selection |
| 0 | System Bus A |
| 1 | System Bus B |

The BIU 10B selects a register in the T-Box to be loaded with the TBX-SEL(2:0) control $20_s$. The T-Box register selected by the TBX-SEL(2:0) code is loaded on the rising edge of the system bus clock when the TBX-LD-B signal $20_d$ is "low".

The following table, Table 1.6, shows the encodings for the signal TBX-SEL(2:0).

TABLE 1.6

| T-Box Register Load Selection (line $20_s$) | |
|---|---|
| TBX SEL(2:0) | TBOX Register |
| 7 | REQ_REG3 |
| 6 | REQ_REG2 |
| 5 | REQ_REG1 |
| 4 | REQ_REG0 |
| 3 | ACK_REG3 |
| 2 | ACK_REG2 |
| 1 | ACK_REG1 |
| 0 | ACK_REG0 |

The instruction processor (IP) 20 reads the contents of the T-Box $20_{bx}$ having registers 32a and 32r with the signals READ-IPC-ACK and the signal READ-IPC-REQ commands. Data from the T-Box $20_{bx}$ is steered through the multiplexers $32_{arx}$ and $32_{cx}$, to be staged by the GOUT-REG register 34, FIG. 2B, before presentation to the instruction processor 20.

Error Registers: Data path gate array 32 supports system bus fault reporting with a 32-bit error log register 44 (ELOG) and a 61-bit invalid address register 45 (INVADDR). These registers are shown in FIG. 2B at element 44 (error log) and element 45 (invalid address).

The invalid address register 45, FIG. 2B, holds the command/address word of the last memory or message operation. When an operation is not acknowledged at the system bus level (that is to say, no module recognizes its address range within the command), then the address and command will have been loaded in the invalid address register 45. The instruction processor 20 can read the invalid address in order to supply it as a parameter of the error interrupt that the processor 20 issues to the operating system whenever an invalid address occurs. The invalid address register 45 is loaded on the rising edge of the system bus clock whenever the signal BIU-LDOUT-B is "low", at line $11_l$, FIG. 2B (bottom).

Whenever the instruction processor 20 is informed by the control logic 26 (IP control logic) that an error has occurred on a system bus operation, the processor 20 will subsequently read the ELOG register 44 within the data path gate array 32 in order to obtain additional information regarding the error. If warranted, the processor 20 supplies the error status to the operating system as an error interrupt parameter.

The error status is actually detected outside of the data path gate array 32. When errors are detected, a shiftable external copy of the ELOG register 44 is updated. When the instruction processor 20 issues a RD-ELOG command, then logic external to the data path gate array 32 serially loads the external error status values into the ELOG register 44 within the gate array 32. This type of technique is used to conserve pins on the data path gate array 32 and also to minimize the number of electrical taps on the G-bus 38, FIG. 2B. The ELOG register 44 is loaded serially by holding the signal 44e, ELOG-SHIFT-B "low". For each rising edge of the system clock, while ELOG-SHIFT-B is "low", then one bit of error information is shifted into the error log register 44.

Configuration Register: The configuration register 46 of FIG. 2B is 17 bits in length. The lower eight bits of the configuration register are compared to x-INBUS bits 39:32 and then qualified with x-CMDVALFF-B (lines 53a, 53b) to generate the output signal x-MATCH-B. This provides a hook in the data path gate array 32 should additional bus command decoding be required.

Attached below is a chart shown as Table 1.7 which shows the breakdown on the configuration register 46.

TABLE 1.7

Configuration Register Breakdown

| Field | Description |
|---|---|
| 7:0 | System Bus Command comparator value |
| 10:8 | Module ID Value |
| 11 | Parity Generation Enable Bar |
| 12 | Reserved |
| 13 | Corrupt Enable Bar |
| 14 | A Bus Parity Check Enable Bar |
| 15 | B Bus Parity Check Enable Bar |
| 16 | G Bus Parity Check Enable Bar |
| 17 | Purge Register Corrupt Enable Bar |

Bits 10:8 contain the Module Identification, ID number, for the central processing module, CPM 10. If the CPM is of domain 0 (which indicates a card slot), it is assigned a module ID of 4; if the CPM is domain 1, it is assigned a module ID of 5. The value of 4 or 5 is loaded by the system maintenance controller 200, FIG. 1, during CPM initialization. When a message is detected on the system bus, 22A, 22B, the CPM 10 compares its module ID against the destination module ID number in the lower three bits of the message command word. If these IDs match, the CPM will accept the message, loading it into the data path gate array 32 and then asserting PE-ACK (Processor Element-Acknowledge) on the system bus 22A, 22B. If the ID's do not match, then the CPM ignores the message.

Parity Generation Enable Bar (Table 1.7): When set "low", this signal forces byte parity to be generated on all the words going to a system bus. If set "high", the parity bits originally captured with the data when loaded from the IP Cache Bus 51 is passed "as is" to the system busses 22A, 22B.

Corrupt Enable Bar (Table 1.7): When "low", this signal 46c allows the data path gate array 32 to mark Purge data for which a parity error was detected as "corrupt". When high, Purge data will be forced to have a corrupt bit value of 1 and a corrupt-bar bit value of 0.

x Bus Parity Check Enable Bar (Table 1.7): These signals are not connected or used.

G-Bus Parity Check Enable Bar (Table 1.7): This signal is not used.

Purge register Corrupt Enable Bar (Table 1.7): When "high", this signal at interface line 38 forces the data on the first (=0) Purge Data Register, $32_p$, to have the proper corrupt values (corrupt=0, corrupt-bar=1). When this signal is set "low", the corrupt bits supplied by the cache with the Purge data, is passed on. This feature makes it possible to use the Purge register $32_p$ as an additional Write buffer should system performance requirements dictate.

The contents of the configuration register 46 are set up through shift chains on the maintenance controller 200 when the CPM is initialized. The configuration flip-flops in 46 are clocked with the system bus clock.

Data Integrity Verification: The data path gate array 32 supports the parity convention of odd-parity on each byte of data or command. This is typical of the Unisys A-11 Series computers. The data path gate array 32 will both check and also generate parity, easing the interface of the instruction processor 20 which do not support parity.

Parity Generation: Command-Address words issued by the instruction processor 20 are filtered in the data path gate array 32 in order to convert the command to its appropriate bus-level command, and to insure that any non-command, non-address fields are zero. Once filtered, parity must be generated on the modified command-address word. The data path gate array 32 provides a byte parity generator, 47 FIG. 2B, between the command words and the x-OUT-REGs. Similarly, data words issued by the instruction processor 20 are also supplied with parity from the same parity generator, 47.

Parity generation on command-address and data words can be disabled, opting instead for passing on the original parity. By initializing the PARITY-GENERATION-ENABLE-BAR flip-flop in the configuration register 46 to a value of "1" will disable the generation of parity on words being transferred on the system busses 22A, 22B.

Parity Checking: Data is checked for odd-byte parity at several points within the data path gate array 32. The gate array 32 can support a copy-back or non-store-through cache architecture. In such an architecture, the cache may contain data which is has been modified by the instruction processor 20. When the processor 20 begins to operate on data not current but held in the cache, space is cleared within the cache, $20_{ch}$, to accommodate the newly required data.

If the space identified to be cleared is "modified" data, the copy-back cache is obligated to purge the modified data back to main memory 44 prior to overriding the cache locations with the new data. With this framework, the data path gate array 32 provides a parity check function on data held in the GIN-REG 33 FIG. 2B. This parity check verifies the integrity of data which has been stored in the cache data RAMs for an indeterminate period of time. However, in a store-through cache architecture, this parity check is not required.

Parity errors detected by the G-BUS parity checker 47, FIG. 2B, are reported by pulling the signal 47p G-PAR-ERR-B equal "low". It is up to the instruction processor 20's control logic $20_f$ to interpret this value at appropriate times in bus operation cycles.

Each system bus input "port" (Port A=$35_{ra}$, $80_{da}$, $32_{ad}$; Port B=$35_{rb}$, $80_{db}$, $32_{dr}$) also verifies the integrity of incoming words by checking for odd-parity on a byte basis. If a parity error is detected on any words being loaded into the x-DATA-REGn, $32_{ad}$, $32_{dr}$, then the message registers x-MSG-REG $32_m$, or x-NDOW-IN 36, will register the appropriate signal xPARERR-B (36pa, 36pb) which will be pulled "low". It is up to the BIU control logic $20_f$, 26, and $20_i$ to interpret the parity error signal only during the appropriate cycles of a system bus operation.

Corrupt Status: In the presently used system, each data word has associated with it two corrupt status bits, namely: (i) CORRUPT and (ii) CORRUPT-BAR (interface line 38, FIG. 2B). The interpretation for all the combinations of the CORRUPT and CORRUPT-BAR are listed below in the Table 1.8.

TABLE 1.8

| Corrupt Status Encoding | | | |
|---|---|---|---|
| CORRUPT | CORRUPT BAR | Corrupt Status | Data Status |
| 0 | 0 | Invalid | Suspect |
| 0 | 1 | Valid | Valid |
| 1 | 0 | Valid | Corrupt |
| 1 | 1 | Invalid | Suspect |

Internal to the gate array 32 corrupt bits are circuits forced to indicate a valid corrupt status and a valid data status on command-address, and data words originating from the instruction processor 20.

In support of a copy-back cache architecture, the data path gate array 32 handles the corrupt status bits on purge data differently from other data words. The CORRUPT-ENABLE-BAR flip-flop in the configuration register 46 allows the corrupt bits for the purge data registers 32p, to be modified if a parity error is detected on the word. If CORRUPT-ENABLE-BAR is "low", a valid corrupt status will remain unchanged. If CORRUPT-ENABLE-BAR is "high", and a parity error is detected on the incoming G-BUS data on bus interface line 38, the corrupt bits will be changed to indicate valid corrupt status on corrupt data. The CORRUPT-ENABLE-BAR bit is set by the maintenance control processor 200 when the central processing module 10, CPM, is initialized.

The corrupt status for the purge PRG-REG0 register $32_p$, can be corrected as it is loaded into the x-OUT-REG register $35_{ra}$, $35_{rb}$. By initializing the Purge-Corrupt-Enable-Bar flip-flop in the configuration register 46 to a value of "1", the x-OUT-REG can only be loaded with valid corrupt status indicative of valid data.

If the Purge-Corrupt-Enable-Bar flip-flop is initialized to a value of "0", the original corrupt status stored in the purge register PRG-REG0, $32_p$, is loaded into the x-OUT-REG ($35_{ra}$, $35_{rb}$, FIG. 2D). The Purge-Corrupt-Enable-Bar flip-flop is loaded by the maintenance processor 200 when the CPM 10 is initialized. The Purge-Corrupt-Enable-Bar flip-flop enables the purge register PRG-REG0 to act as a secondary Write buffer in store-through cache architectures.

Data Steering: As seen in the data path gate array 32 of FIG. 2B, there are five multiplexers which are used to route data in the chip. These multiplexers are seen as $32_{arx}$, $32_{kx}$, $32_{cx}$, $32_{px}$, and $30_{ca}$. These multiplexers are controlled externally to the data path gate array 32 by respective lines 50, 49, 48, 51, $32_{am}$.

As seen in FIG. 2B, there are two sets of data registers which are respectively dedicated to the two system busses. Thus, the data registers (0,1,2,3) designated "A" and shown as $32_{ad}$ are dedicated to the system bus 22A. Likewise, the data registers designated "B" (0,1,2,3) and shown as $32_{dr}$ are data registers which are dedicated to the other system bus, 22B. These registers form part of "input ports" for the data path chip 32.

G-Bus Output Multiplexer: The G-Bus output multiplexer $32_{cx}$ feeds the GOUT-REG register 34 with one of twelve sources. These sources include the following: the PWAR register 40, the invalid address register INVADDR 45, the T-Box multiplexer output on line 32t from the multiplexer $32_{arx}$, the ELOG error log register 44, and the x-DATA-REGn registers $32_{ad}$ and $32_{dr}$. The G-Bus output multiplexer $32cx$ consists of a 16-to-1 multiplexer and is provided with four external control signals designated G-MSEL(3:0) as seen on line 48 in FIG. 2B.

The following Table 1.9 shows the output multiplexer controls handling MUX $32_{cx}$ via line 48 for transmittal to the G-Bus line 38.

TABLE 1.9

| G-Bus Output Multiplexer ($32_{arx}$) Controls (External to DP 32) | |
|---|---|
| G MSEL(3:0) | Multiplexer Source |
| 0 | A_DATA_REG_0 |
| 1 | A_DATA_REG_1 |
| 2 | A_DATA_REG_2 |
| 3 | A_DATA_REG_3 |
| 4 | B_DATA_REG_0 |
| 5 | B_DATA_REG_1 |
| 6 | B_DATA_REG_2 |
| 7 | B_DATA_REG_3 |
| 8 | ELOG |
| 9 | PWAR |
| 10 | INVADDR |
| 11 | 0 |
| 12 | 0 |
| 13 | 0 |
| 14 | 0 |
| 15 | T-Box multiplexer output |

Transfer Box $20_{bx}$ (T-Box) System Bus Selector: T-Box ($20_{bx}$) system bus selector (multiplexer $32_{kx}$) routes data into the T-box $20_{bx}$ registers 32a, 32r from either the "A" Bus 22A or the "B" Bus 22B message-holding registers $32_{ma}$, $32_{mb}$ (x-MSG-REG). The system bus selector MUX $32_{kx}$ of FIG. 2B, is a two-to-one multiplexer controlled externally by the TBX-BUS-SEL signal shown on line 49 of FIG. 2B.

The T-box system bus selector ($32_{kx}$) controls are shown in the Table 1.10 indicated below.

TABLE 1.10

| T-Box System Bus Selector Controls ($32_{kx}$) | |
|---|---|
| TBX BUS SEL | Multiplexer Source |
| 0 | A_MSG_REG |
| 1 | B_MSG_REG |

T-Box Output Multiplexer: ($32_{arx}$): The T-Box output multiplexer, shown as $32_{arx}$ of FIG. 2B is an 8-to-1 multiplexer which selects one of the four acknowledgement registers, ACK-REGn, $32_a$ or one of the four request registers REQ-REGn $32_r$, for presentation to the G-Bus output multiplexer $32_{cx}$. The T-box multiplexer $32_{arx}$ is controlled externally by the TBUS-MSEL(2:0) signals shown on line 50 of FIG. 2B.

The following Table 1.11 shows the controls (line 50) for the T-bus multiplexer ($32_{arx}$).

TABLE 1.11

| T-Bus Multiplexer Controls | |
|---|---|
| TBUS MSEL (2:0) | Multiplexer Source |
| 0 | ACK_REG_0 |
| 1 | ACK_REG_1 |
| 2 | ACK_REG_2 |
| 3 | ACK_REG_3 |
| 4 | REQ_REG_0 |
| 5 | REQ_REG_1 |
| 6 | REG_REG_2 |
| 7 | REQ_REG_3 |

Select Outputs Multiplexer: The select outputs multiplexer $32_{px}$, FIG. 2B, chooses either the Read-Write address command multiplexer $30_{ca}$ output, one of the four message registers, MSG-REGn, $32_m$, or one of the four purge registers PRG-REGn, $32_p$ or the DATAREG 39 as a source for the x-OUT-REG $35_{ra}$ and $35_{rb}$. These outputs are fed through busses 11a, 11b onto 22A, 22B system busses. The purge registers (0,1,2,3) are shown at $32_p$, the data register is shown at element 39, and the "x" out registers are shown at $35_{ra}$ and $35_{rb}$. The message registers (0,1,2,3) are shown as group element $32_m$. The select outputs multiplexer $32_{px}$ is fed from the command address multiplexer $30_{ca}$ and from the Data Register 39, Purge Registers 32p, and Message Registers 32m. Multiplexer $32_{px}$ is externally controlled by DOUT-MSEL(3:0) signals shown on line 51 of FIG. 2B.

The following Table 1.12 shows the controls for the select outputs multiplexer, $32_{px}$, wherein the right-hand column shows the source to the multiplexer and the left-hand column shows the data out multiplexer select signal.

TABLE 1.12

| Select Outputs Multiplexer ($32_{px}$) Controls | |
|---|---|
| DOUT MSEL (3:0) | Multiplexer Source |
| 0 | Address multiplexer output |
| 1 | 0 |
| 2 | 0 |
| 3 | 0 |
| 4 | MSG_REG_0 |
| 5 | MSG_REG_1 |
| 6 | MSG_REG_2 |
| 7 | MSG_REG_3 |
| 8 | PRG_REG_0 |
| 9 | PRG_REG_1 |
| 10 | PRG_REG_2 |
| 11 | PRG_REG_3 |
| 12 | DATA_REG |
| 13 | 0 |
| 14 | 0 |
| 15 | 0 |

Command-Address Multiplexer: The command address multiplexer $30_{ca}$ is shown in FIG. 2B as $30_{ca}$. This multiplexer selects either one of the Purge Registers (32p), Read Command Address, Write Command Address, Purge Command Address (32c) or the PWAR command registers (40) to be forwarded on to the select outputs multiplexer $32_{px}$. The address multiplexer $30_{ca}$ is a 4-to-1 multiplexer which is controlled externally via the ADDR-MUX-SEL(1:0) signals on line $32_{am}$. These are shown in Table 1.13.

Table 1.13 is a table showing the command-address multiplexer controls with the right-hand column showing the multiplexer source and the left-hand column showing the command address multiplexer select signal.

TABLE 1.13

| Command Address Multiplexer ($30_{ca}$) Controls | |
|---|---|
| ADDR MUX SEL(1:0) | Multiplexer Source |
| 0 | PCMDAD |
| 1 | PWAR |
| 2 | RCMDAD |
| 3 | WCMDAD |

Logic Functions: In addition to the data storage and transfer functions supported by the data path gate array 32, data is also manipulated with logical functions exercised from within the data path gate array 32. The primary logical functions include: command encoding/transformation, and command/data decoding.

Command-Encoding/Address-Stripping: The instruction processor 20 uses bits 30 and 31 of the command/address words to hold arbitrary data. The memory storage module (MSM 44, FIG. 1) on the described system will decode an address field, including bits 31:0. In order to prevent ambiguities and erroneous invalid address errors, the data path gate array 32 will zero the bits 31:30 before presenting a command address word to the system busses 22A, 22B. The system bus input bits 31:30 are forced to "0" when a command/address type register is selected to be loaded into the x-OUT-REG register $35_{ra}$, $35_{rb}$, FIG. 2B.

The system bus command field (bits 39:32) is encoded in the data path gate array 32 based on the BIU-CMD (2:0) field on line 52 supplied by the BIU 10B of the central processing module, CPM. The BIU command (2:0) is shown in FIG. 2B at line 52. The Table 1.14 shows the encoding for the system bus commands.

TABLE 1.14

| System Bus Command Encoding | | | |
|---|---|---|---|
| IP/Cache Command | BIU CMD | Bus Encoding | Bus Command |
| Read, Fetch, Read Code, Read Next Code | 0 | 01 | Read Word |
| Read Time of Day | 1 | 81 | Read Time of Day |
| N/A | 2 | 0D | Private Read |
| Read, Fetch, Read Code, Read Next Code | 3 | 05 | Shared Read |
| Purge | 4 | 06 | Purge Block |
| Send Req/Ack | 5 | 82 | Send Message |
| Overwrite | 6 | 02 | Write Word |
| Read Lock | 7 | 13 | Read Lock |

It should be noted that the data path gate array 32 can support encodings for a single word or for block Read operations (01 or 05 bus encoding commands, respectively). The BIU control logic $20_p$, FIG. 1, determines if the READ, FETCH, READ-CODE, and READ-NEXT-CODE operations will be encoded on the system busses 22A, 22B, as word or block operations.

The system bus encodings are presented to x-OUTREG $35_{ra}$, $35_{rb}$, FIG. 2B, on bits 39:32 whenever a command/address register is selected to be loaded into the x-OUTREG registers, $35_{ra}$, $35_{rb}$.

System Bus Command Decoding: The data path gate array 32 provides three comparators on each bus to evaluate the contents of the system bus by using bits 39:32. Proper operation of the bus interface unit (BIU) requires the BIU 10B to identify message operations directed to itself. In addition to supporting a non-store-through cache design, the

19

New Data Overwrite (NDOW) command/address words must be compared against the outstanding purge operations. The gate array 32 provides the logic to identify and hold NDOW command/address words. A third comparator can be configured when the gate array 32 is initialized in order to decode any system bus command.

The new data overwrite comparator ($36_c$, 36) is used to decode the NDOW commands. The output of the comparator $36_c$ is qualified with the command valid flip-flop, CMD-VLDFF-B, a delayed version of the system bus command valid signal, CMBVLD-B, in order to generate a signal designated 0-x-NDOWCMD, shown in FIG. 2B on line 52 for external output. The incoming signal on line $52_i$ is used to load the "x" Bus NDOW holding register 36. The O-x-NDOWCMD signals (line 52i) are NOR'ed together in order to generate the output NDOWCMD-B for the gate array 32. This output is shown on line 52 of FIG. 2B.

A programmable system bus comparator is also provided here. Here a system bus command can be loaded into the CMP-VAL field of the gate array configuration register 46, where the contents of CMP-VAL will be compared against the bits 39:32 of the system busses 22A, 22B. The output of the comparator is qualified with the signal on $53_a$, $53_b$ of CMDVLDFF-B to establish that this is a command word. The command valid flip-flop signals are shown in FIG. 2B at lines $53_a$, $53_b$. The qualified output from each bus is combined to generate the gate array's MATCH-B output signal (not shown). If a match is detected on either bus 22A or 22B, the MATCH-B signal will go "low".

Message Decoding: The Send Message comparator $36_c$, FIG. 2B, compares the system bus command field bits 39:32 to a value of 4"82" which is the system bus message command. The Module ID comparator (MODID) (not shown) compares the least significant three bits of the system bus inputs to a preconfigured MODID value loaded into the configuration register 46 by the maintenance processor 200. The result of the Send Message comparator $36_c$ is qualified by the output of the Module ID comparator. The combined result is further qualified with the command valid flip-flop signal CMDVLDFF-B on line 53, FIG. 2B. If all of these conditions co-exist, the x-MSG-B output 54A, 54B is generated to indicate to the bus interface unit (BIU) support logic that a message for this particular central processing module, 10, (CPM) was detected.

The data path gate array 32 provides supporting logic to facilitate the "message discard" protocol. Since unsolicited messages may be exchanged between CPM 10 and the task control unit (TCU), such as element 42 in FIG. 1, a protocol is established to handle the cases where unsolicited request messages occur simultaneously.

The essence of this protocol is that each request message must be acknowledged by its recipient. If both CPM 10 and the TCU 42 (FIG. 1) send request messages to each other simultaneously, the TCU 42 will defer to the CPM 10, and the message sent by the TCU to the CPM will be discarded.

The hardware in the CPM 10 must track whether the current request message in the T-box $20_{bx}$ is valid or is "discarded". Towards that end, the BIU's external logic maintains a status bit designated DISCARD-B (not shown) which it supplies to the instruction processor 20. In accord with the discard protocol, a signal DISCARD-B is set and reset according to the following conditions:

| | |
|---|---|
| Inactive (1) | Whenever a Request Message is |

20

-continued

| | |
|---|---|
| | received by CPM 10. |
| Active (0) | When the instruction processor 20 reads the first word of the request message. |
| Active (0) | When an Acknowledge Message is received from the TCU (Task Control Unit) 42. |

In addition to detecting the presence of a message, the data path gate array 32 also provides logic to detect the source of an Acknowledge Message. Detection of an Acknowledge Message from a TCU 42 supports the off-chip discard logic.

Acknowledge Message: The data path gate array 32 identifies an incoming message as either (i) Request-type messages or (ii) Acknowledge-type messages. Request and Acknowledge Messages are distinguished by bits 47:44 of the data word of the message. If 47:44 is—4"8" (hexadecimal), then the message is of an Acknowledge-type of message. If the bits 47:44 is—4"1" (hex), it is then a Request-type message.

The first word of the message is identified by qualifying it with one-clock delayed version of the signal designated O-x-MSG-B (54A, 54B), FIG. 2B. If the bit 47:44 of the first word are equal to 4"8", the O-x-ACK-MSG-B is taken "low". This is seen in FIG. 2B on the Acknowledge Message, line 55, which correlates to the Acknowledge Message line for the system bus 22A.

The signals O-x-ACK-MSG-B are combined to form the output signal designated ACK-MSG-B of the data path gate array 32. This signal is true for one clock whenever an Acknowledge Message is received on either bus.

TCU Message (Task Control Unit 42): In order to facilitate implementation of the discard protocol, the Source Unit ID field in word one of the message must be parsed to determine if the message was sent by the TCU 42. The source unit ID is held in bits 31:28 of the first data word in a message. If the source unit ID is—4"E", the message is then from the TCU 42.

A comparator in parity check decoders $80_{da}$, $80_{db}$, is used to determine if the 31:28 field is equal to 4"E". The output of the comparator line 56 (TCU-MSG-B) is further qualified with a one clock delayed version of the signal O-x-MSG-B on line 54A or 54B; this identifies the first data word in the message. If all these conditions coincide, then the signal O-x-TCU-MSG-B (line 56) will go "low" for a single clock period. The signals O-x-TCU-MSG-B shown on line 56 of FIG. 2, are combined before exiting the data path gate array 32, as is the TCU-MSG-B signal. If either the signal O-x-TCU-MSG-B is "low", then the signal TCU-MSG-B will also be "low".

Request Message: The data path gate array 32 identifies incoming messages as either Request-type messages or Acknowledge-type messages. Request and Acknowledge Messages are distinguished by the bits 47:44 of the first data word of the message.

The first word of the message is identified by qualifying with a one-clock delayed version of the signal O-x-MSG-B lines 54A, 54B. If bits 47:44 of the first word are equal to "1", then the O-x-REQ-MSG-B is taken "low" ($56_m$ FIG. 2B). The signals from each of the busses designated O-x-REQ-MSG-B are combined to form the output signal designated REQ-MSG-B, as the output signal from the data path gate array 32. This signal is true for one clock wherever a Request Message is received on either bus.

Data Pointer Functions: Each system bus "port" ($35_a$, $32_{ad}$; $35_b$, $32_{dr}$) provides a modulo four-bit pointer to support loading of the four data registers (FIG. 2B, $32_{ad}$, $32_{dr}$). The pointers are two bits and each can be cleared or incremented from external controls. To clear the x-bus pointer, the signal x-RST-DIN-PTR-B ($90_{pa}$, $90_{pb}$) is held "low" and the signal HOLD16 at line 62 is held "high" during the rising edge of the 16 MHz clock, CLK16M, shown at line 58, FIG. 2B. The pointer clears synchronously on the clock edge according to the attached logic function table designated Table 1.15.

TABLE 1.15

| | | | | System Bus Pointer Function | | |
|---|---|---|---|---|---|---|
| x-BUS | CLK16M | HOLD16_B | LOAD-n | x-RST_DIN_PTR_B | x_INCR_DIN_PTR_B | x_DATAREGn |
| X | X | 0 | N | X | X | No Change |
| X | ↑ | 1 | 0 | 0 | X | No Change |
| Q | ↑ | 1 | N + 1 | 1 | 0 | x_DATA_REGv ... Q |

Note:
X = "don't care"

The x-RST-DIN-PTR $90_{pa}$, $90_{pb}$ activates the x-DATA-REG load controls $90_{ra}$, $90_{rb}$, FIG. 2B while the signal x-INCR-DIN-PTR-B is "low". If this signal is "low" on the rising edge of CLK16M, then the x-DATA-REGn (where n is the value of the x-DIN-PTR) is loaded with the data currently on the x-Bus port of the data path gate array 32. On the same clock edge, the x-DIN-PTR increments to the next modulo four value.

Shift Chain: In the normal (system) mode (TEST-SEL-B=1), the data path gate array 32 contains five shift chains: (i) a 16 MHz state chain; (ii) a 32 MHz state chain; (iii) a configuration chain; (iv) a error log chain; and (v) a boundary scan chain. While the 32 MHz state chain is clocked with the IP/Cache 32 MHz clock, all other chains are shifted at the 16 MHz system clock rate.

In addition to the normal or system shift chains, the data path gate array 32 can be configured in a "test" mode (TEST-SEL-B=0) which breaks the various shift chains into 40 shift chains, each averaging 61 bits. In the "test" mode, all of the 40 chains may be shifted simultaneously. This faculty shortens device test time by allowing the tester to establish a test pattern or to read a result pattern in fewer shift cycles. The data path gate array 32 provides two distinct Serial Data Input signals which are: SDI, 60, ELOG-SDI 44s (FIG. 2B), and also provides one shared Serial Data Output signal (SDO 63) plus two pairs of hold-shift control signals, and an additional shift control. For example, the processor clock can be used to provide 32 MHz signals, while the System Bus Clock could provide 16 MHz signals.

In FIG. 2B, the line 60 shows the SDI and the shift/hold signals are shown on lines 61 and 62.

One hold/shift set (HOLD16-BSHIFT16B) is used to manage all of 16 MHz shift chains of the data path gate array 32. The 16 MHz shift chains include the configuration chain, the boundary scan chain, and the 16 MHz state access chain.

A second set of signals on lines 61, 60 for hold/shift (HOLD32-B, SHIFT32-B) controls the 32 MHz state shift chain. This last shift control (ELOG-SHIFT-B) governs the Error Log Register 44 of FIG. 2B.

Shift Chain Selects: The control signals, HOLD16-B and SHIFT16-B are shared among of all the 16 MHz shift chains with the exception of the Error Log chain. Individual chains are selected for shifting by the signals designated SNAKE-SEL(1:0). The signal 65s value SNAKE-SEL(1:0) determines which shift chain will receive the SHIFT16-B scan control signal. Additionally, the SNAKE_SEL(1:0) value governs which shift chain output is multiplexed unto the data path gate array 32 (common SDO output, shown at line 63 of FIG. 2B). The encodings for the SNAKE-SEL(1:0) are shown in Table 1.16.

TABLE 1.16

Shift Chain Selects

| SNAKE SEL 1 | SNAKE SEL 0 | Shift Chain |
|---|---|---|
| 0 | 0 | 16 MHz State |
| 0 | 1 | Boundary Scan |
| 1 | 0 | Configuration |
| 1 | 1 | 32 MHz State |

In the case of the 16 MHz shift chains, the SHIFT-16B scan control input 61 is qualified by the SNAKE-SEL(1:0) encoding before it is distributed to the respective chain groups. Furthermore, the SNAKE-SEL(1:0) encoding is used to select the appropriate shift chain output to be applied to the data path gate array 32's common SDO pin on line 63 of FIG. 2B.

Since there is only one processor clock (32 MHz) shift chain, having its own independent scan control (SHIFT32-B), the SNAKE-SEL(1:0) value on line 65s FIG. 2B, is not used to qualify the scan controls for the 32 MHz shift chain. The SNAKE-SEL(1:0) which provides the snake select controls are still required to select the output of the 32 MHz state chain as the SDO output of the data path gate array 32. The ELOG (Error Log) shift chain is a special case. The ELOG chain is shifted as part of the 16 MHz state chain, but it can also be shifted independently while the system is running, to load in error information "On-The-Fly".

The ELOG-SHIFT-B signal 44e provides a second scan control for ELOG portion of the 16 MHz state chain. When the signal ELOG-SHIFT-B is "low", the error log chain shifts on the rising edge of the 16 MHz clock. Only the ELOG will shift under these circumstances as the 16 MHz state chain is not effected by the ELOG-SHIFT-B signal.

ELOG-SHIFT line 44e is used to load the ELOG register 44 with error information from an external error accumulator on the CPM circuit board. The ELOG register 44 within the data path gate array 32, provides the path for passing the error information back to the internal processor (IP) 20 microcode and to the master control program operating system (MCP) via the G-BUS 38 of FIG. 2B.

Shift Procedures: In the data path gate array 32, the scan control overrides the hold control causing a shift to occur on each rising edge of the appropriate clock, that is to say, the 16 MHz or the 32 MHz clock. "Hold" should be held "low" throughout the shift of the entire scan chain, to insure that the shift chain data does not change between pulses.

In order to effect a shift operation, data is input at the shift chain's SDI port on line 60, FIG. 2B, and the active low "hold" signal for the chain is made low. On each rising edge of the clock, when the active low shift signal is "low", data will then scan through the chain from SDI, line 60, through to SDO, line 63 of FIG. 2B. The following control combinations for the gate array shift chains are shown below in Table 1.17.

TABLE 1.17

Shift Chain Controls

| Shift Chain | SDI | SDO | SHIFT | HOLD | SNAKE-SEL 1 | SNAKE-SEL 0 | Clock |
|---|---|---|---|---|---|---|---|
| 16 MHz State | SDI | SDO | SHIFT16_B | HOLD16_B | 0 | 0 | CLK16M |
| Boundary Scan | SDI | SDO | SHIFT16_B | HOLD16_B | 0 | 1 | CLK16M |
| Configuration | SDI | SDO | SHIFT16_B | HOLD16_B | 1 | 0 | CLK16M |
| 32 MHz State | SDI | SDO | SHIFT32_B | 1HOLD32_B | 1 | 1 | CLK32M |
| ELOG | ELOG_SDI | — | ELOG_SHIFT | — | — | — | CLK16M |

Shift Chain Bit Orderings: The ordering of state elements within the four major shift chains are given in the Table 1.18 indicated below.

TABLE 1.18

Boundary Scan Shift Chain

| Field name | Msb | Len |
|---|---|---|
| TCU_MSG_B | 53 | 1 |
| REQ_MSG_B | 52 | 1 |
| ACK_MSG_B | 51 | 1 |
| NDOWCMD_B | 50 | 1 |
| MATCH_B | 49 | 1 |
| MATCH_B | 48 | 1 |
| G_PARERR_B | 47 | 1 |
| B_PARERR_B | 46 | 1 |
| A_PARERR_B | 45 | 1 |
| NDOW_LD_B | 44 | 1 |
| B_CMDVALFF_B | 43 | 1 |
| A_CMDVALFF_B | 42 | 1 |
| INV_ADDR | 41 | 1 |
| INC_PWAR_B | 40 | 1 |
| LD_PWAR_B | 39 | 1 |
| TBX_LD_B | 38 | 1 |
| TBX_MSEL(2:0) | 37 | 3 |
| B_MSGLD_B | 34 | 1 |
| A_MSGLD_B | 33 | 3 |
| B_DRIVE_B | 30 | 1 |
| A_DRIVE_B | 29 | 1 |
| B_DRIVE_B | 28 | 1 |
| A_DRIVE_B | 27 | 1 |
| B_RST_DIN_PTR_B | 26 | 1 |
| A_RST_DIN_PTR_B | 25 | 1 |
| B_INCR_DIN_PTR_B | 24 | 1 |
| A_INCR_DIN_PTR_B | 23 | 1 |
| B_LCOUT_B | 22 | 1 |
| A_LDOUT_B | 21 | 1 |
| SYS_LDOUT_B | 20 | 1 |
| DOUT_MSEL(3:0) | 19 | 4 |
| BIU_CMD(2:0) | 15 | 3 |
| ADDR_MSEL(1:0) | 12 | 2 |
| D_OUT_LDEN(3:0) | 10 | 4 |
| G_MSEL(3:0) | 6 | 4 |
| G_DRIVE_B | 2 | 1 |
| G_LDOUT_B | 1 | 1 |
| G_LDIN_B | 0 | 1 |

* "Len" refers to length of field

Table 1.19 is a table showing the configuration shift chain involved.

TABLE 1:19

Configuration Shift Chain

| Field name | Msb | Len |
|---|---|---|
| TCU_MSG_B_C | 71 | 1 |
| REG_MSG_B_C | 70 | 1 |
| ACK_MSG_B_C | 69 | 1 |
| NDOWCMD_B_C | 68 | 1 |
| MATCH_B_C | 67 | 1 |
| B_MSG_B_C | 66 | 1 |
| A_MSG_B_C | 65 | 1 |
| G_PARERR_B_C | 64 | 1 |
| B_PARERR_B_C | 63 | 1 |
| A_PARERR_B_C | 62 | 1 |
| NDOW_LD_B_C | 61 | 1 |
| B_CMDVALFF_B_C | 60 | 1 |
| A_CMDVALFF_B_C | 59 | 1 |
| INC_PWAR_B_C | 58 | 1 |
| LD_PWAR_B_C | 57 | 1 |
| TBX_LD_B_C | 56 | 1 |
| TBX_MSEL_C(2:0) | 55 | 3 |
| TBX_BUS_SEL_C | 52 | 1 |
| TBX_SEL_C(2:0) | 51 | 3 |
| B_MSGLD_B_C | 48 | 1 |
| A_MSGLC_B_C | 47 | 1 |
| B_DRIVE_B_C | 46 | 1 |
| A_DRIVE_B_C | 45 | 1 |
| B_RST_DIN_PTR_B_C | 44 | 1 |
| A_RST_DIN_PTR_B_C | 43 | 1 |
| B_INCR_DIN_PTR_B_C | 42 | 1 |
| A_INCR_DIN_PTR_B_C | 41 | 1 |
| B_LDOUT_B_C | 40 | 1 |
| A_LDOUT_B_C | 39 | 1 |
| SYS_LDOUT_B_C | 38 | 1 |
| DOUT_MSEL_C(3:0) | 37 | 4 |
| BIU_CND_C(2:0) | 33 | 3 |
| ADDR_MSEL_C(1:0) | 30 | 2 |
| DOUT_LDEN_C(3:0) | 28 | 4 |
| G_MSEL_C(3:0) | 24 | 4 |
| G_DRIVE_B_C | 20 | 1 |
| G_LDOUT_B_C | 19 | 1 |
| G_LIN_B_C | 18 | 1 |
| NO_USE(1) | 17 | 1 |
| GPARCHK_EN_B(0) | 16 | 1 |
| BPARCHK_EN_B(0) | 15 | 1 |
| APARCHK_EN_B(0) | 14 | 1 |
| COR_EN_B(0) | 13 | 1 |
| NO_USE(0) | 12 | 1 |
| PARGEN_EN_B(0) | 11 | 1 |

TABLE 1:19-continued

Configuration Shift Chain

| Field name | Msb | Len |
|---|---|---|
| MODID(2:0) | 10 | 3 |
| CMPVAL(7:0) | 7 | 8 |

State names in the configuration shift chain are suffixed with -C which are control bits for the boundary scan state elements which have the same name. When the boundary scan control bits are low, the chip is in "normal" mode, the boundary scan is transparent and the data path gate array 32 receives inputs from the device pins and its output drives the device pins.

When the boundary scan control bits are "one", the chip is in "boundary" mode, where the gate array receives its input from the boundary scan chain and its outputs are driven by the boundary scan chain. In "boundary" mode, the device is effectively isolated from the circuit boards.

Table 1.20 shows the field names, the most significant bit, and the LEN (length) for the 16 MHz state chain.

TABLE 1:20

16MHz State Chain

| Field name | Msb | Len |
|---|---|---|
| ELOG | 1562 | 32 |
| REQ_REG3 | 1530 | 61 |
| REQ_REG2 | 1469 | 61 |
| REQ_REG1 | 1408 | 61 |
| REQ_REG0 | 1347 | 61 |
| ACK_REG3 | 1286 | 61 |
| ACK_REG2 | 1225 | 61 |
| ACK_REG1 | 1164 | 61 |
| ACK_REG0 | 1103 | 61 |
| INV_ADDR | 1042 | 61 |
| B_NDOW_REG | 981 | 61 |
| B_DATA_REG0 | 920 | 61 |
| B_DATA_REG1 | 859 | 61 |
| B_DATA_REG2 | 798 | 61 |
| B_DATA_REG3 | 737 | 61 |
| B_MSG_REG | 676 | 61 |
| B_CMDVALFF | 615 | 1 |
| B_DATA_PTR | 614 | 2 |
| B_OUT_REG | 612 | 61 |
| NDOW_OUT | 551 | 61 |
| NDOW_IN | 490 | 61 |
| A_NDOW_REG | 429 | 61 |
| A_DATA_REG0 | 368 | 61 |
| A_DATA_REG1 | 307 | 61 |
| A_DATA_REG2 | 246 | 61 |
| A_DATA_REG3 | 185 | 61 |
| A_MSG_REG | 124 | 61 |
| A_CMDVALFF | 63 | 1 |
| A_DATA_PTR | 62 | 2 |
| A_OUT_REG | 60 | 61 |

Table 1.21 is a table showing the field name, the most significant bit and the LED for the 32 MHz state chain.

TABLE 1:21

32MHz State Chain

| Field name | Msb | Len |
|---|---|---|
| BOUT_REG | 914 | 61 |
| GIN_REG | 853 | 61 |
| WR_ADDR_REG | 792 | 61 |
| RD_ADDR_REG | 731 | 61 |
| PWAR_REG | 670 | 61 |
| PURGE_REG | 609 | 61 |
| PURGE_REG0 | 548 | 61 |
| PURGE_REG1 | 487 | 61 |
| PURGE_REG2 | 426 | 61 |
| PURGE_REG3 | 365 | 61 |
| MSG_REG0 | 304 | 61 |
| MSG_REG1 | 243 | 61 |
| MSG_REG2 | 182 | 61 |
| MSG_REG3 | 121 | 61 |
| DATA_REG | 60 | 61 |

Chip Test Mode: In order to enable faster chip test time, the system clock (1563 bits) and the processor clock (915 bits) data chains are respectively segmented into 25 and 15 short chains by asserting a "0" on the pin TEST-SEL-B (chip test mode) where selected non-critical pins serve as the SDIs and SDOs.

For the 16 MHz chains, the flip-flops are clocked with the system bus clock input (CLK16M) on line 58 of FIG. 2B. All the chains shift simultaneously on the rising edge of the 16 MHz clock when both HOLD16-B is low and when the signal SHIFT16-B is also low.

The attached Table 1.22 shows the 16 MHz shift chains in the "chip test mode" with the shift data input on the B-BUS and the shift data output on the A-BUS.

TABLE 1.22

16 MHz Shift Chains in the Chip Test Mode

| SDO | Bits | SDI |
|---|---|---|
| A_BUS(0) | A_DLY_MSG, A_DATALD(1:0), A_OUT_REG(60:0) | B_BUS(0) |
| A_BUS(1) | A_MSG_REG(60:0) | B_BUS(1) |
| A_BUS(2) | A_DATA_REG3(60:0) | B_BUS(2) |
| A_BUS(3) | A_DATA_REG2(60:0) | B_BUS(3) |
| A_BUS(4) | A_DATA_REG1(60:0) | B_BUS(4) |
| A_BUS(5) | A_DATA_REG0(60:0) | B_BUS(5) |
| A_BUS(6) | A_NDOW_IN(60:0) | B_BUS(6) |
| A_BUS(7) | NDOW_0 | B_BUS(7) |
| A_BUS(8) | NDOW_1 | B_BUS(8) |
| A_BUS(9) | B_DLY_MSG, B_DATALD(1:0), B_OUT_REG(60:0) | B_BUS(9) |
| A_BUS(10) | B_MSG_REG(60:0) | B_BUS(10) |
| A_BUS(11) | B_DATA_REG3(60:0) | B_BUS(11) |
| A_BUS(12) | B_DATA_REG2(60:0) | B_BUS(12) |
| A_BUS(13) | B_DATA_REG1(60:0) | B_BUS(13) |
| A_BUS(14) | B_DATA_REG0(60:0) | B_BUS(14) |
| A_BUS(15) | B_NDOW_IN(60:0) | B_BUS(15) |
| A_BUS(16) | INVADDR(60:0) | B_BUS(16) |
| A_BUS(17) | ACK_REG0(60:0) | B_BUS(17) |
| A_BUS(18) | ACK_REG1(60:0) | B_BUS(18) |
| A_BUS(19) | ACK_REG2(60:0) | B_BUS(19) |
| A_BUS(20) | ACK_REG3(60:0) | B_BUS(20) |
| A_BUS(21) | REQ_REG0(60:0) | B_BUS(21) |
| A_BUS(22) | REQ_REG1(60:0) | B_BUS(22) |
| A_BUS(23) | REQ_REG2(60:0) | B_BUS(23) |
| A_BUS(24) | ELOG(31:0),REQ_REG3(60:0) | B_BUS(24) |

For the processor clock chains, the flip-flops are clocked with the IP/Cache clock input (CLK32) on line 64 of FIG. 2B. All of the chains shift simultaneously on the rising edge of the processor clock when both signals HOLD32-B on line 62 is low and SHIFT32-B on line 61 is also low.

Table 1.23 indicates the 32 MHz shift chains in the chip test mode, where the B-BUS provides the shift data input and A-BUS provides the shift data output.

TABLE 1:23

| 32 MHz Shift Chains-Shift Test Mode | | |
|---|---|---|
| SDO | Bits | SDI |
| A_BUS(25) | DATA_REG(60:0) | B_BUS(25) |
| A_BUS(26) | MSG_REG3(60:0) | B_BUS(26) |
| A_BUS(27) | MSG_REG2(60:0) | B_BUS(27) |
| A_BUS(28) | MSG_REG1(60:0) | B_BUS(28) |
| A_BUS(29) | MSG_REG0(60:0) | B_BUS(29) |
| A_BUS(30) | PRG_REG3(60:0) | B_BUS(30) |
| A_BUS(31) | PRG_REG2(60:0) | B_BUS(31) |
| A_BUS(32) | PRG_REG1(60:0) | B_BUS(32) |
| A_BUS(33) | PRG_REG0(60:0) | B_BUS(33) |
| A_BUS(34) | PRGADDR_REG(60:0) | B_BUS(34) |
| A_BUS(35) | PWAR(60:0) | B_BUS(35) |
| A_BUS(36) | RDADDR_REG(60:0) | B_BUS(36) |
| A_BUS(37) | WRADDR_REG(60:0) | B_BUS(37) |
| A_BUS(38) | GIN_REG(60:0) | B_BUS(38) |
| A_BUS(39) | GOUT_REG(60:0) | B_BUS(39) |

Boundary Scan Chain: (Not shown in drawings). The Data path gate array 32 provides for "boundary scan" operations. All data busses are registered at both their inputs and outputs, allowing them to be sampled or put into forced operation for board test purposes. The data registers on the chip interface are scannable through either the 32 MHz state chain or the 16 MHz state chain.

In addition to the data busses, the data path gate array 32 receives control input and generates status input/outputs. These are made to be both controllable and observable using the boundary scan techniques.

For each control input to the data path gate array, there has been provided a configuration flip-flop, a boundary flip-flop and a multiplexer. The configuration flip-flop governs the multiplexer. When the configuration flip-flop is zero, the multiplexer selects the gate array 32's input pin to be routed onto the chip. When the configuration flip-flop is "1", the multiplexer selects the boundary flip-flop to be routed onto the chip.

The boundary flip-flop is part of the boundary scan chain, and the configuration flip-flop is part of the configuration shift chain. The boundary scan flip-flop, when it is not in the "hold" mode, will be continuously loading the output of the boundary multiplexer. This allows the inputs of the chip to be sampled as part of the board test. Furthermore, when the configuration flip-flop is loaded with "1", the boundary scan flip-flop can be used to simplify testing of the gate array 32 at the system level.

All but nine of the chip's control pins have the boundary scan feature. The nine pins which do not have the boundary scan feature have them excluded. The nine pins which do have a boundary scan cell are as follows: DOUT-MSEL(3:0); G-MSEL(3:0); and INC-PWAR-B. These represent the data out memory select signal, the G-BUS memory select signal and the increment program word address register signal.

In a similar fashion, for each "status" output, there exists a boundary flip-flop and a configuration flip-flop and a multiplexer. The configuration flip-flop governs the multiplexer. The output of the multiplexer feeds the output pin of the chip.

The configuration register 46 determines which multiplexer source is delivered to the pin of the chip. When the configuration flip-flop is "zero", the normal chip logic drives the output of the data path gate array 32. When the configuration flip-flop is "1", the boundary flip-flop drives the output pin on the data path gate array 32.

When the signal HOLD16-B is "high", the boundary flip-flop is consequently loaded with output of the boundary multiplexer. The boundary scan flip-flop can be used to force the output of a chip to a particular value, or to sample the value being delivered to the output of the chip by the internal logic of the data path gate array 32. The boundary flip-flop is part of the boundary scan chain, and the configuration flip-flop is part of the configuration chain.

The present data path gate array interface system disclosed herein details the design and operation of an adaptable data path interface chip. This interface is unique with its simplicity of design and its ability to be configured in various different fashions based upon the logic surrounding it since all the controls are routed to the outside of the data path interface chip. The described data path interface chip supports both write-through and write-back caching in addition to messaging, translation clock rate and protocol support, parity checking and generation, all for operation with two system busses. In addition to the use of configuration registers and shift chains, the data path interface supports testing and diagnostics for integrity.

While a specific embodiment of the invention has been described, the concept is to be understood as defined by the following claims.

What is claimed is:

1. A data path gate array interface linking a central processor means, operating at a first clock rate and first protocol, to first and second system bus means of a dual system bus means operating at a second clock rate and second protocol, said interface comprising:

(a) a single chip gate array including:
  (a1) input pathway means for said dual system bus means to said central processor means, said input pathway means including:
    (i) a first input port means connected to said first system bus means, and including:
      (ia) first data register means for holding a 4 word packet of data received from said first system bus means;
      (ib) message register means for holding messages received from said first system bus means;
    (ii) a second input port means connected to said second system bus means, and including:
      (iia) second data register means for holding a 4 word packet of data received from said second system bus means;
      (iib) message register means for holding messages received from said second system bus means;
    (iii) wherein said first and second input port means operate at said second clock rate and said second protocol;
    (iv) translation logic means for converting incoming data from said dual system bus means from said second clock rate and second protocol to said first clock rate and first protocol for subsequent transmission to said processor means;
  (a2) output pathway means for transmitting commands, data, and messages to said first and second dual system bus means, including:
    (i) multiple register means for receiving commands, data and messages from said central processor means at said first clock rate and said first protocol;
    (ii) multiple multiplexer means for transmitting selected ones of said commands, data and messages to said first and second system bus means including:
      (iia) a translation multiplexer means for converting said commands, data and messages to said second clock rate and said second protocol.

2. A data path gate array interface linking first and second system busses of a dual system bus means to a central processing module having a processor means and translation unit means, said interface comprising:
- (a) input port means providing registers for receiving and holding incoming data from said first and second system busses;
- (b) output port means including register means for receiving and holding data to be sent out onto said first and second system busses;
- (c) command address register means for holding commands indicating addresses to be read from and or addresses to be written to;
- (d) message register means for receiving and holding messages from said processor means to be transmitted to said dual system bus means;
- (e) acknowledgment register means for holding acknowledgment messages from external modules transmitting via said dual system bus means to said processor means;
- (f) request register means for holding requests received via said dual system bus means from external modules for transmission to said processor means;
- (g) purge register means for holding data initiated by said processor means for transmittal to said external resource module means via said dual system bus means for purposes of purging unwanted data;
- (h) first multiplexer means for selecting command, address, purge, and message data for transmittal to said output port means;
- (i) second multiplexer means for selecting acknowledgment and/or request messages for transmittal to said processor means.

3. The interface of claim 2 which includes:
- (a) parity checking means for validating commands, addresses and message data received from said dual system bus means or transmitted onto said dual system bus means.

4. The interface of claim 2 which includes:
- (a) means for determining the validity or invalidity of addresses being transmitted onto said dual system bus means.

5. The interface of claim 2 which includes translation logic means for holding acknowledgment words and request words received from said dual system bus means operating at a second clock rate and second protocol for subsequent transmittal to said processor means which operates at a first clock rate and first protocol, said translation logic means including:
- (a) means for receiving said acknowledgment words and request words at said second clock rate and said second protocol;
- (b) means for transmitting said acknowledgment words and request words to said processor means at said first clock rate and said first protocol.

6. In a single chip data path interface which is substantially limited to registers and multiplexers and which is controlled by external control logic, said chip providing an interface between a processor means and first and second system busses of a dual system bus means, said interface comprising:
- (a) first and second input register means for receiving and holding message data received from external resource modules on said dual system bus means;
- (b) first and second channel transmittal means for conveying message data from said first and second input register means to a receiving multiplexer means and/or to a receiving message register means;
- (c) first and second output register means for holding outgoing message data originating from said processor means and temporarily held in a general register means;
- (d) said general register means for holding commands, destination addresses and data generated by said processor means, for conveyance, via said dual bus means, to a selected one of said external resource modules;
- (e) said receiving message register means for holding (i) acknowledgment messages and (ii) request messages from said external resource modules, and including:
  - (e1) output message multiplexer means providing an output to said receiving multiplexer means;
  - (e2) input message multiplexer means for selecting one of a plurality of said acknowledgment or request messages in said receiving message register means;
- (f) said receiving multiplexer means for selecting transmittal, to said processor means, of either said first or second input register means or said output from said output message multiplexer means.

* * * * *